(12) United States Patent
Erickson et al.

(10) Patent No.: US 11,668,875 B2
(45) Date of Patent: Jun. 6, 2023

(54) PERISCOPE OPTICAL ASSEMBLY WITH INSERTED COMPONENTS

(71) Applicant: Cisco Technology, Inc., San Jose, CA (US)

(72) Inventors: Ashley J. M. Erickson, Danville, CA (US); Matthew J. Traverso, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 322 days.

(21) Appl. No.: 16/836,768

(22) Filed: Mar. 31, 2020

(65) Prior Publication Data
US 2021/0302715 A1 Sep. 30, 2021

(51) Int. Cl.
| G02B 6/12 | (2006.01) |
| G02B 6/24 | (2006.01) |
| G02B 6/26 | (2006.01) |
| G02B 6/28 | (2006.01) |
| G02B 6/35 | (2006.01) |
| G02B 23/08 | (2006.01) |
| G02B 6/30 | (2006.01) |
| G02B 6/125 | (2006.01) |

(52) U.S. Cl.
CPC ............ *G02B 6/24* (2013.01); *G02B 6/12* (2013.01); *G02B 6/12002* (2013.01); *G02B 6/12004* (2013.01); *G02B 6/264* (2013.01); *G02B 6/2804* (2013.01); *G02B 6/2821* (2013.01); *G02B 6/3528* (2013.01); *G02B 6/125* (2013.01); *G02B 6/30* (2013.01); *G02B 6/3596* (2013.01); *G02B 23/08* (2013.01); *G02B 2006/12104* (2013.01)

(58) Field of Classification Search
CPC .. G02B 6/12; G02B 6/12002; G02B 6/12004; G02B 6/125; G02B 6/24; G02B 6/264; G02B 6/2804; G02B 6/2821; G02B 6/30; G02B 6/3528; G02B 6/3596; G02B 7/003; G02B 23/08; G02B 2006/12104
See application file for complete search history.

(56) References Cited

U.S. PATENT DOCUMENTS

| 6,608,946 | B2 | 8/2003 | Kikuchi et al. |
| 6,839,476 | B2 | 1/2005 | Kim et al. |
| 7,242,822 | B2 * | 7/2007 | Yamada ................. G02B 6/138 |
| | | | 385/14 |

(Continued)

OTHER PUBLICATIONS

U.S. Appl. No. 16/570,040 "Alignment Features for Fiber to Chip Alignment," filed Sep. 13, 2019.

*Primary Examiner* — Ryan A Lepisto
(74) *Attorney, Agent, or Firm* — Patterson + Sheridan, LLP

(57) ABSTRACT

Periscope assemblies are provided which have a light path that travels in a first plane along the first waveguide, a second plane along the second waveguide that is parallel to the first plane, and along a third plane along the third waveguide that intersects the first plane and the second plane. In some examples the periscope assembly includes first and second carriers comprising respective first and second waveguides and defining respective first and second cavities in which a third carrier comprising a third waveguide is disposed and optionally includes an optical component. In some examples, the cavities are defined in one or more carriers on a mating surface, on a side opposite to the mating surface, or on a side perpendicular to a mating surface.

13 Claims, 29 Drawing Sheets

(56) References Cited

U.S. PATENT DOCUMENTS

| | | | | |
|---|---|---|---|---|
| 7,251,393 | B2* | 7/2007 | Stevens | G02B 6/3514 385/32 |
| 7,362,934 | B2* | 4/2008 | Hamano | G02B 6/30 385/88 |
| 8,267,583 | B2* | 9/2012 | Yao | G02B 6/12002 384/31 |
| 8,498,504 | B2* | 7/2013 | Matsubara | H05K 1/0274 385/52 |
| 8,958,667 | B2* | 2/2015 | Kwok | H01L 21/302 385/24 |
| 9,715,064 | B1* | 7/2017 | Gambino | G02B 6/43 |
| 10,379,292 | B2 | 8/2019 | Matsubara | |
| 10,393,959 | B1 | 8/2019 | Razdan et al. | |
| 10,429,597 | B2 | 10/2019 | ten Have et al. | |
| 10,459,160 | B2 | 10/2019 | Brusberg | |
| 10,564,352 | B1 | 2/2020 | Razdan et al. | |
| 2005/0281502 | A1* | 12/2005 | Kobayashi | G02B 6/4214 385/14 |
| 2020/0049890 | A1 | 2/2020 | Patel et al. | |

* cited by examiner

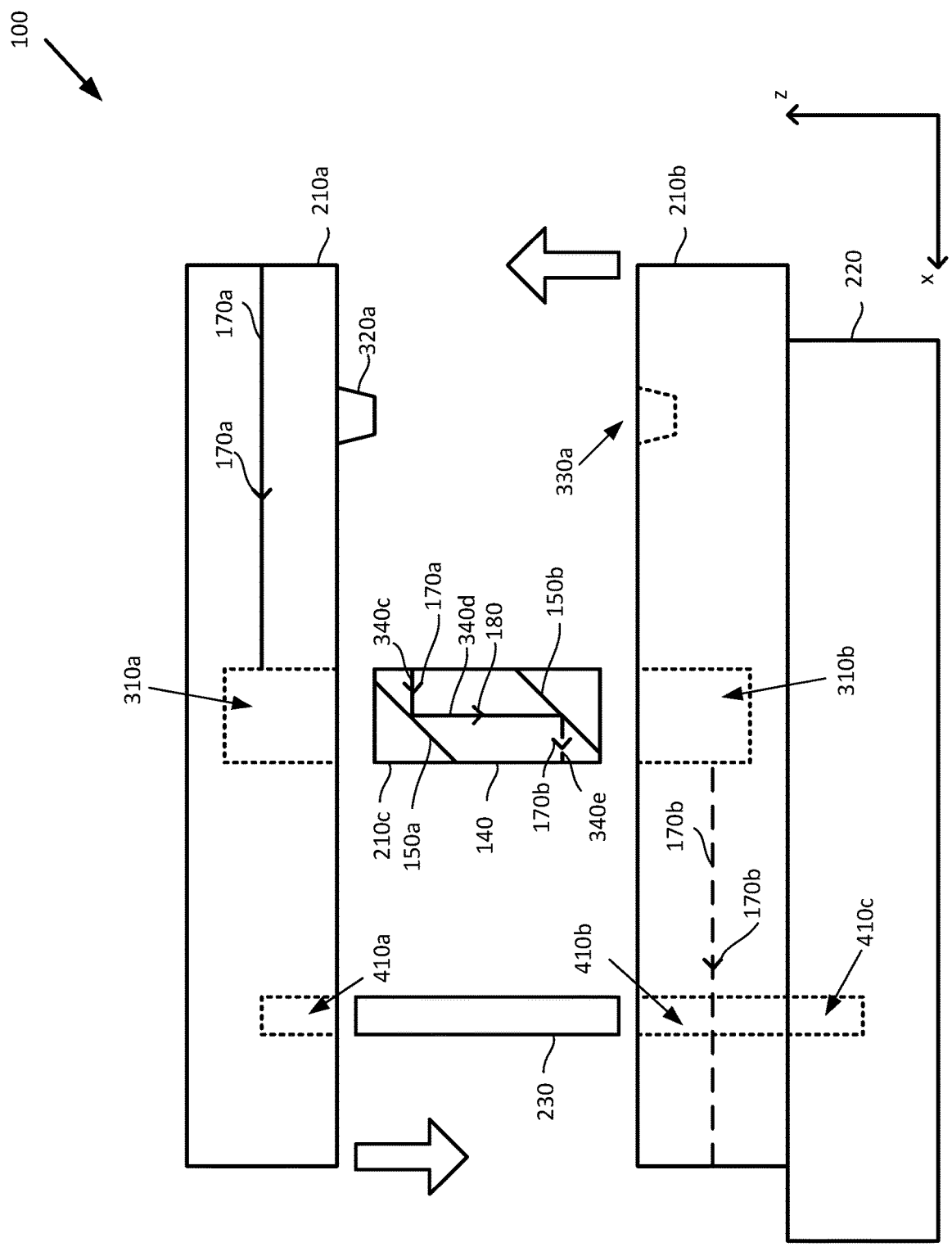

US 11,668,875 B2

PERISCOPE OPTICAL ASSEMBLY WITH INSERTED COMPONENTS

TECHNICAL FIELD

Embodiments presented in this disclosure generally relate to fabricating features in optoelectronic devices. More specifically, embodiments disclosed herein provide for the insertion of optical devices in the light path of the waveguides in an optical assembly incorporating mirrors to redirect the light path.

BACKGROUND

Waveguides are optical components that confine and direct the path that light travels within the medium of an optical device. The optical waveguides define areas of increased refractive index relative to the optical medium (e.g., $SiO_2$) to direct the light along a desired trajectory. Due to the refractive index difference of the waveguides relative to bulk material of the optical device, waveguides can define curved paths that gradually shift the light from one straight path to another.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 4A-4I illustrate various constructions for a periscope assembly using a structural insert, according to embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
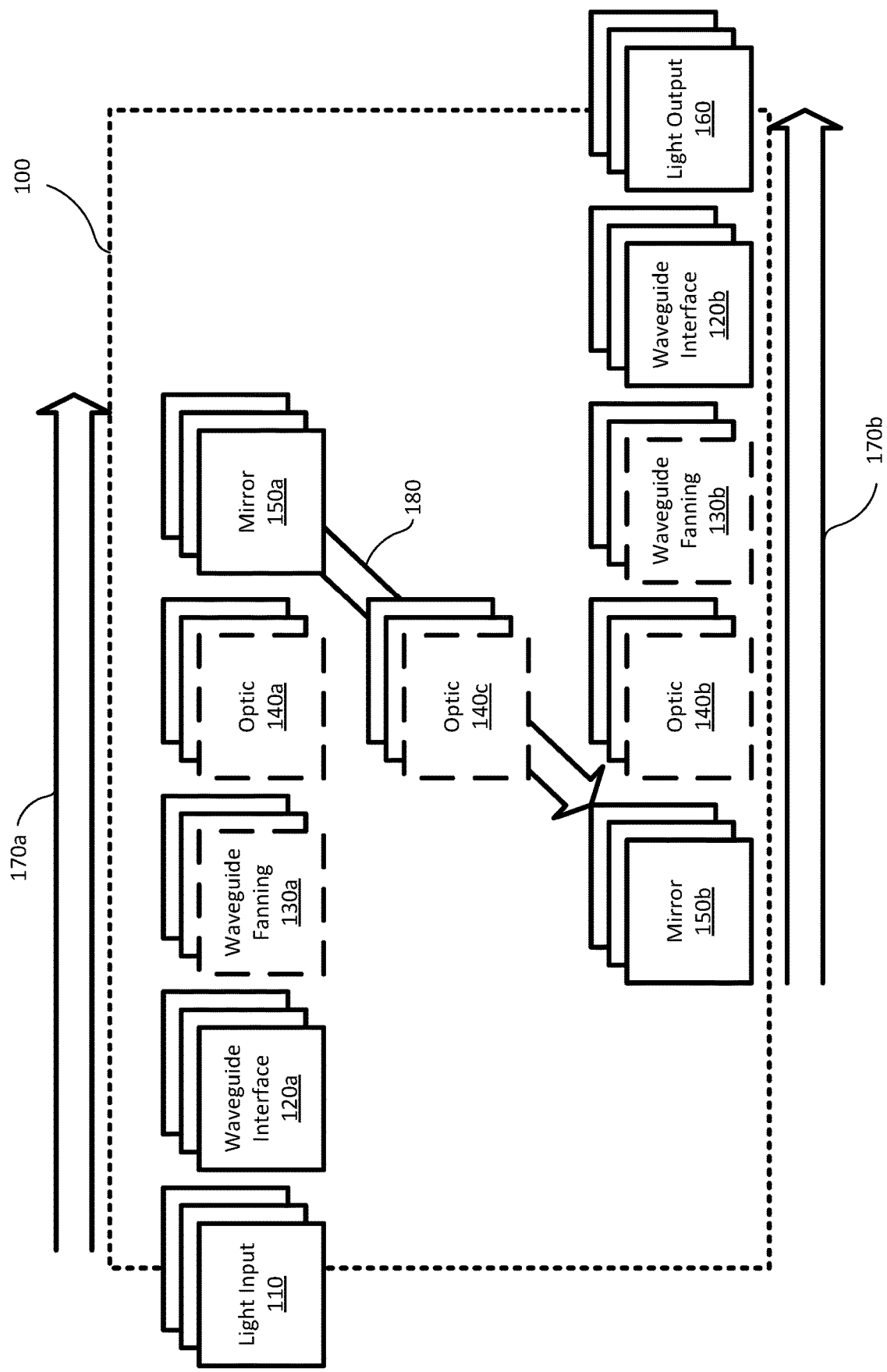
FIG. 1 illustrates an example light path through a periscope assembly, according to embodiments of the present disclosure.

One embodiment presented in this disclosure is a periscope assembly, comprising: a first carrier comprising a first waveguide and defining a first cavity; a second carrier comprising a second waveguide and defining a second cavity; a third carrier comprising a third waveguide, wherein the third carrier is disposed in the first cavity and in the second cavity; a first mirror optically coupled to the first waveguide and the third waveguide; and a second mirror optically coupled to the third waveguide and the second waveguide; wherein a light path travels in a first plane along the first waveguide, a second plane along the second waveguide that is parallel to the first plane, and along a third plane along the third waveguide that intersects the first plane and the second plane.

One embodiment presented in the disclosure is a periscope assembly, comprising: a first carrier comprising: a first waveguide; a second waveguide; a third waveguide, intersectional with the second waveguide; and a first mirror, optically coupling the second waveguide and the third waveguide; and defining a first cavity; a second carrier, comprising: a fourth waveguide, aligned with the third waveguide; a fifth waveguide, intersectional with the fourth waveguide; and a second mirror, optically coupling the fourth waveguide and the fifth waveguide; a third carrier, comprising: a sixth waveguide; and an optic associated with the sixth waveguide and configured to alter an optical property of an optical signal carried over the sixth waveguide; and wherein the third carrier is disposed in the first cavity and the sixth waveguide completes a light path between the first waveguide and the second waveguide.

One embodiment presented in the disclosure is a periscope assembly, comprising: a first carrier, including: a first waveguide defined between a light input and a first mirror, defining a first planar path at a first height of the periscope assembly; a second waveguide defined between a light output and a second mirror, defining a second planar path at a second height of the periscope assembly, different than the first height; and a third waveguide defined between the first mirror and the second mirror, defining an intersecting path that conducts optical signals from the first height to the second height; and a second carrier, including: a fourth waveguide; and an optic associated with the fourth waveguide; wherein the first carrier defines a cavity in a selected one of the first planar path, the second planar path, and the intersecting path; and wherein the second carrier is secured in the cavity and the fourth waveguide completes the selected one of the first planar path, the second planar path, and the intersecting path.

Example Embodiments

The present disclosure provides systems and methods for the creation and deployment of periscope interposers and other optical devices using mirrors defined in the light paths of waveguides to rapidly and compactly redirect the direction in which light travels in the optical device. By defining at least a pair of mirrors in the light path, via etching, lithography, metal plating, chemical deposition, precision molding, and/or laser patterning, the periscope assembly can receive optical signals on one plane and redirect those optical signals to another plane, including planes parallel to the original plane, over a shorter distance than if the waveguide were curved to direct the optical signals to a new plane. Additionally, by staggering several mirrors, the waveguides can receive optical signals in a first physical arrangement, and output optical signals in a different physical arrangement as the waveguides fan out within the optical assemblies.

The optical assemblies described herein are constructed of multiple components, of which one or more components are captured within cavities defined in the other components. These inserted components can include the mirrors used to redirect the light paths, as well as other optical components in the light paths (e.g., optical gratings, isolators, lenses, polarization rotators, phase shifters, index matched epoxy preforms, optical filters, and the like) and physical components outside of the light paths (e.g., epoxy preforms, alignment pins, strengthening supports, and the like). The inserted components can be modular; allowing a fabricator to selectively insert different components into standardized cavities to alter the behavior of the optical assembly for a given application, while selecting from standardized groups of components.

FIG. 1 illustrates an example light path through a periscope assembly 100, according to embodiments of the present disclosure. The components of the periscope assembly 100 include, a light input 110, where an optical signal is received by the periscope assembly 100 from a first external device, and a light output 160, where an optical signal is output from the periscope assembly 100 to a second external device. The terms "input" and "output" are used herein as a convention to describe opposing ends of the light path in the present disclosure for ease of explanation, but in various embodiments, the light path may be bi-directional or oriented in reverse to the described signal pathway (i.e., receiving optical signals at the light output 160 and outputting optical signals at the light input 110).

Within a periscope assembly 100, the light path includes a first planar path 170a (generally, planar path 170) in-plane with the light input 110, a second planar path 170b in-plane with the light output 160, in which the first planar path 170a and the second planar path 170b are located in different planes from one another. To conduct optical signals from one planar path 170 to the other, the periscope assembly 100 defines an intersecting path 180. In various embodiments, optical signals are redirected from the first planar path 170a to the intersecting path 180 via a first mirror 150a (generally, mirror 150), and from the intersecting path 180 to the second planar path 170b via a second mirror 150b. The angles of the mirrors 150 affect the relative angles of the planar paths 170 and the intersecting path 180. For example, the mirrors 150 may be angled such that the intersecting path 180 is perpendicular to the first planar path 170a and the second planar path 170b. In further embodiments, the mirrors 150 may be angled to direct the intersecting path 180 at acute or obtuse angles relative to the planar paths 170. Accordingly, the waveguides defining the intersecting path 180 are arranged to be intersectional (i.e., not parallel) with the planar paths 170 to complete the light path between the waveguides defining the planar paths 170.

Although the present disclosure generally discusses "a light path," it will be appreciated that a periscope assembly can include multiple light paths, each with a first planar path 170a, and intersecting path 180, and a second planar path 170b. These multiple light paths may have different arrangements on a first side (e.g., at an input) compared to a second side (e.g., at an output) relative to one another, and the descriptions of various portions of a given light path being in a first or a second plane are relative to the given light path. For example, several light paths can have corresponding first planar paths 170a that are not co-planar with one another (e.g., are arranged in a circular shape) and that transit the periscope assembly 100 to terminate in second planar paths 170b that are co-planar with one another (e.g., are arranged in a linear shape). Accordingly, the designation of a given light path beginning in a first plane and terminating in a second plane has no bearing on the planes in which other light paths are defined.

The first planar path 170a, second planar path 170b, and the intersecting path 180 each are defined by regions that conduct the transmission of optical signals over known pathways, which are generally referred to herein as waveguides. The waveguides contain and separate the optical signals over the course of the light paths so that a first optical signal received from a first light input (e.g., a first instance of a light input 110) exits the periscope assembly 100 at a first light output (e.g., a first instance of a light output 160 paired with the first instance of a light input 110) without (beyond a threshold amount) interference on or interference from a second optical signal received from a second light input (e.g., a different, second instance of a light input 110) that exits the periscope assembly 100 at a second light output (e.g., a second instance of a light output 160 paired with the second instance of a light input 110). In various embodiments, at least some of the waveguides are defined through a fabrication process that selectively deposits and removes different materials (e.g., by vapor deposition and etching) to produce a physical structure for the waveguide having the desired dimensions and optical properties. In some embodiments, at least some of the waveguides are defined via laser patterning of a substrate material, in which a laser precisely imparts a three-dimensional pattern into the material to control the relative refractive indices of patterned and non-patterned (or exposed versus non-exposed) portions of the matrix material. In such embodiments, the laser shines a high intensity light into the material of the optical component (e.g., a $SiO_2$ based material) to break chemical bonds within the material to alter the light-transmission properties thereof to define one or more waveguides.

The light input 110 is secured with the periscope assembly 100 by various first waveguide interfaces 120a (generally, waveguide interface 120; collectively, waveguide interfaces 120) and the light output 160 is secured with the periscope assembly by the second waveguide interfaces 120b. In some embodiments, waveguide interfaces 120 include individualized securing features to optically link individual waveguides defined in the periscope assembly 100 with individual optical fibers and/or photonic waveguides (e.g., SiN waveguides) defined in various external photonic platforms (e.g., photonic integrated circuits). In some embodiments, waveguide interfaces 120 include collective securing features to optically link several waveguides defined in the periscope assembly 100 with several paired optical fibers and/or photonic waveguides (e.g., SiN waveguides) defined in various external photonic platforms (e.g., photonic integrated circuits). The waveguide interfaces 120 include, but are not limited to, index matched epoxies, direct-joints, evanescent-joints, anti-reflection coatings, index altering coatings, lenses, etc.

A single periscope assembly 100 can include one or several light paths, each including a corresponding light input 110 and light output 160. The several light inputs 110 may be arranged in a first order or schema, and may travel through the periscope assembly 100 to exit at the light outputs 160 at a second, different order or schema. In various embodiments, these separate light paths can be organized on several different planes or on a shared plane. For example, a series of three light inputs 110 may be arranged in a horizontal line, and the corresponding series of three light outputs 160 are arranged in a triangular pattern, as a horizontal line (on a different plane than the input-line), or as a vertical line. As will be appreciated, with a different number of input/output pairs, different patterns are possible.

To account for different input/output pairs being located on different planes from one another and to enable the fabricator to re-order light inputs 110 relative to the light outputs 160, a fabricator can define different angles of mirrors 150 and/or different lengths of the intersecting paths 180 to re-order the input and output schemas. In a further example, an fabricator can define one or more first waveguide fannings 130a (generally, waveguide fanning 130) in the first planar path 170a and/or a second waveguide fanning 130b in the second planar path 170b to internally space or order the individual waveguides defined in the periscope assembly 100. Waveguide fannings 130 include arrangements that increase the spacing between individual waveguides, that decrease the spacing between individual waveguides, and/or leave the spacing between (at least some) individual waveguides unchanged. In some embodiments, a waveguide fanning 130 enables a fabricator to increase the physical separation between waveguides and thus provide additional space to define other elements in conjunction with the waveguides.

Within the periscope assembly 100, a fabricator can include various optical devices in addition to the waveguides to affect the transmission of optical signals over the optical signaling pathway. The fabricator can (optionally) include one or more of a pre-mirror optic 140a (generally, optic 140) between the light input 110 and the first mirror 150a on the waveguides of the first planar path 170a, a post-mirror optic 140b between the second mirror 150b and the light output 160 on the waveguides of second planar path 170b, and a mid-mirror optic 140c between the first mirror 150a and the second mirror 150b on the waveguides of the intersecting path 180. The optics 140 can include various optical devices, including, but not limited to: a lens, an optical filter (e.g., highpass, lowpass, bandpass, and polarity filters), a polarization rotator, an optical amplifier, a laser, a heatsink, a thermal insulator, a thermal heating element; a phase shifter, an optical signal probe, an optical isolator, alternative transmission materials with different refractive indices or transmission speeds than the waveguides (e.g., an air-filled (or a predefined gas composition) gap, a vacuum-gap, an epoxy (index matched or otherwise), etc.), and like devices that are configured to alter an optical property of an optical signal transmitted over an affected or associated waveguide.

When several light paths are defined in the periscope assembly 100, a fabricator can include different (including none) optics 140 on the different light paths, or include the optics 140 at different locations in the periscope assembly 100 (e.g., to size constraints). For example, a first light path can include a pre-mirror optic 140a of a first type (e.g., a bandpass filter tuned to a first wavelength), a second light path can include a pre-mirror optic 140a of a second type (e.g., a bandpass filter tuned to a second wavelength), and a third light path can omit a pre-mirror optic 140a. In a further example, a first light path can include a pre-mirror optic 140a of a first type (e.g., a polarization filter), a second light path can include a post-mirror optic 140b of the first type, and the third light path can include a mid-mirror optic 140c of the first type.

A fabricator can include the various optics 140 in the periscope assembly 100 by fabricating the optics 140 monolithically with the waveguides of the periscope assembly 100 (e.g., by co-fabricating the waveguides and optics 140 as one device) or by separately fabricating the optics 140 and inserting the optics 140 into the light paths fabricated in the periscope assembly 100. A fabricator can construct thereby fabricate a periscope assembly 100 to receive various optics 140 which, when inserted and secured in designated cavities, complete the construction of the periscope assembly. Beneficially, a fabricator can define a modular periscope assembly 100 that can accept various optics 140 to meet various deployment scenarios; using a standardized base that defines the waveguides and mirrors 150 that is customizable by selectively inserting different optics 140. Additionally, by separating the fabrication processes for the standardized base and the optics 140, a fabricator may reduce inventory overhead and reduce scrap rates (e.g., due to reductions in tolerance stacking, reductions in a number of process steps, and/or the separation of incompatible fabrication processes).

Figure 2A:
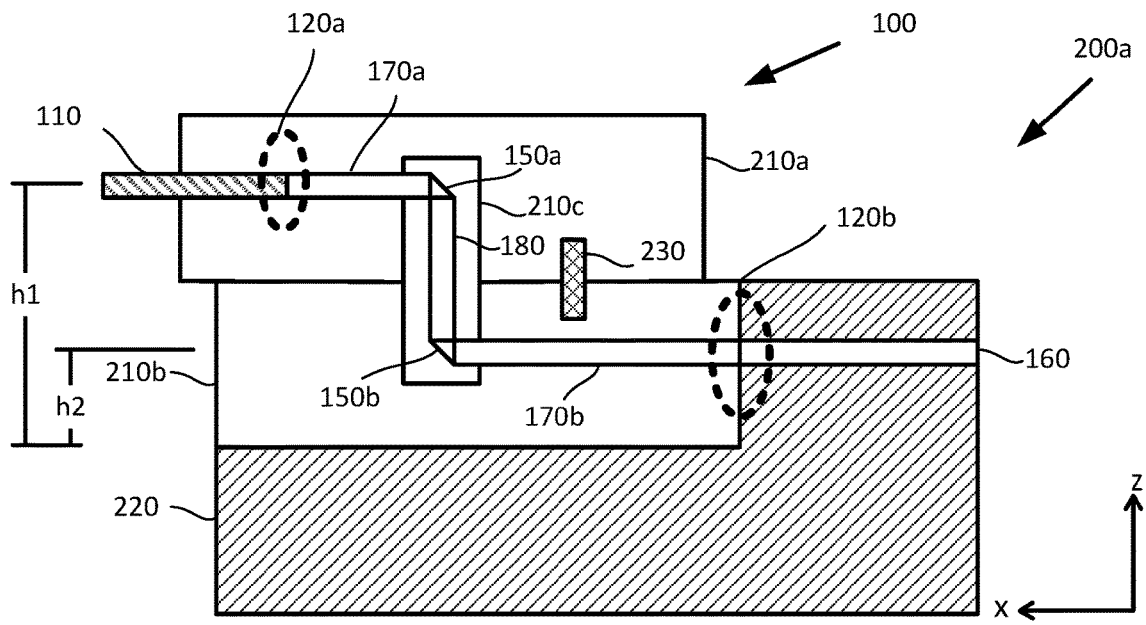
FIGS. 2A-2C illustrate coupling arrangements for a periscope assembly and another optical element, according to embodiments of the present disclosure.
Figure 2B:
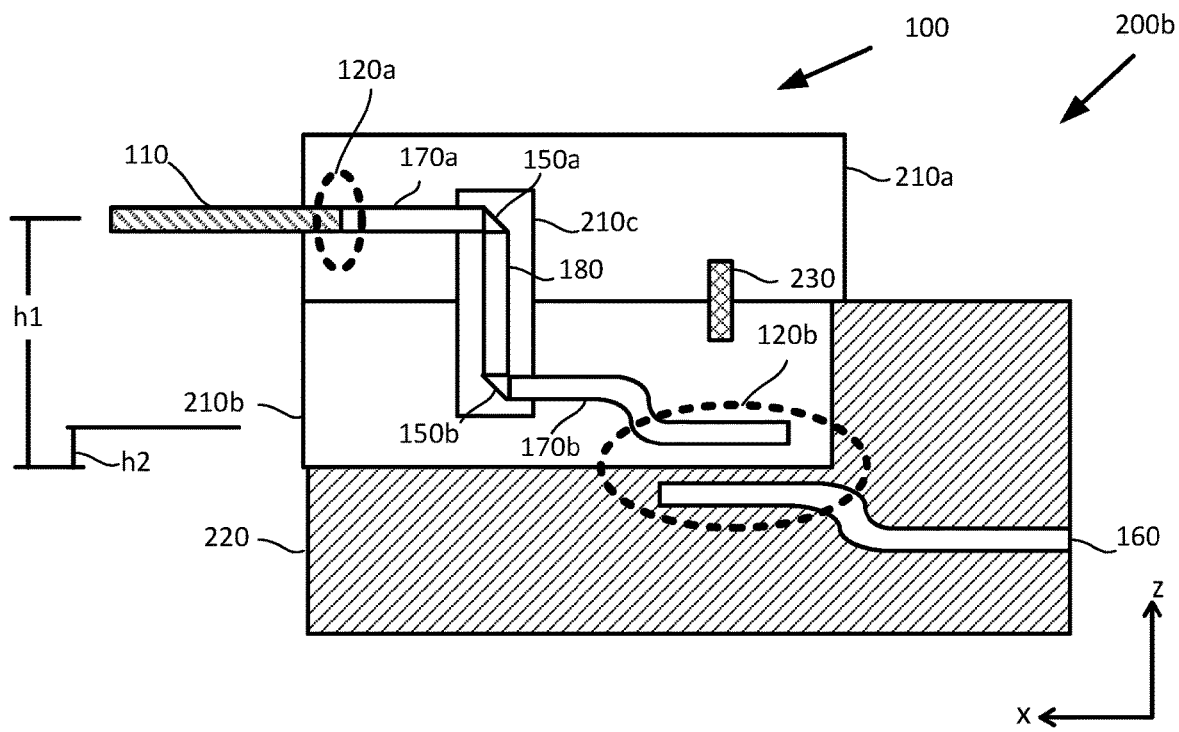
Figure 2C:
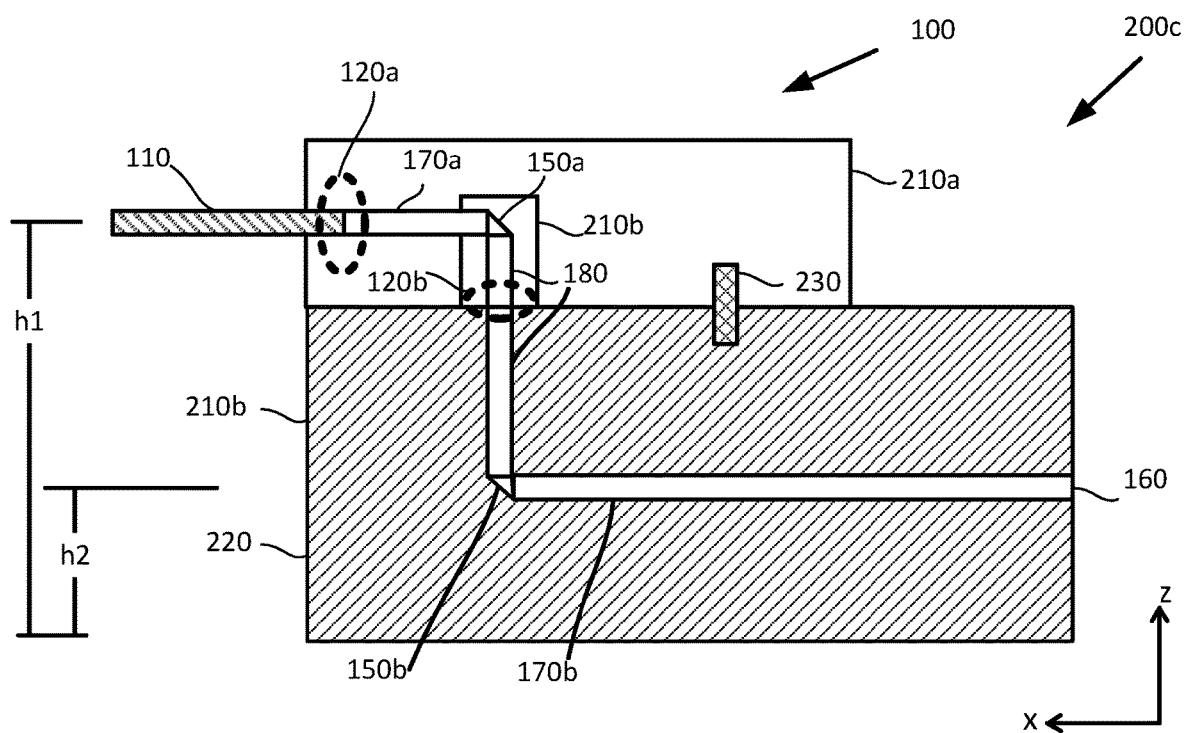

FIGS. 2A-2C illustrate coupling arrangements 200a-c (generally coupling arrangements 200) for a periscope assembly 100 and another optical element 220, such as, for example, a shared photonic platform or an optical cable, according to embodiments of the present disclosure.

In each of the illustrated coupling arrangements 200a and 200b, the periscope assembly 100 is formed with a first carrier 210a (generally, carrier 210) in which a portion of the first planar path 170a is defined, a second carrier 210b in which a portion of the second planar path 170b is defined, and a third carrier 210c in which a portion of the first planar path 170a, the first mirror 150a, the intersecting path 180, the second mirror 150b, and a portion of the second planar path 170b are defined. In the illustrated coupling arrangement 200c, the periscope assembly 100 is formed with a first carrier 210 in which a portion of the first planar path 170a is defined, and a second carrier 210b in which the first mirror 150a and a portion of the intersecting path 180 are defined. The remained of the intersecting path 180, the second mirror 150b, and the second planar path 170b are defined in the third coupling arrangement 200c in the optical element.

The carriers 210 can be constructed of various bulk materials (e.g., $SiO_2$, glass) in which the various waveguides, waveguide interfaces 120, waveguide fannings 130, optics 140, and mirrors 150 are formed to define the respective light paths. In various embodiments, different portions of the light path can be defined in different carriers 210 and/or a different number of carriers 210 can be used. The carriers 210 can be secured to one another via various epoxies and/or via physical capture. For example, the third carrier 210c can be captured between the first carrier 210a and the second carrier 210b with or without the use of an epoxy due to the physical arrangement of the carriers 210 relative to one another.

Additionally, in some embodiments, a fabricator can supply various structural inserts 230 between two or more carriers 210 outside of the light paths. The structural inserts 230 can supply different material properties to the assembled periscope assembly 100 (e.g., additional rigidity, thermal expansion/compression compensation) and/or help provide for the alignment between two carriers 210.

As illustrated, a light input 110 (e.g., a fiber optic cable) is coupled with the first planar path 170a at the first waveguide interface 120a, and the second planar path 170b is coupled to the light output 160 (e.g., a waveguide in a PIC) at the second waveguide interface 120b. The waveguides of the periscope assembly 100 are located at a first height $h_1$ on a first side (coupled with the light input 110) and are located at a different, second height $h_2$ on a second side coupled with the optical element 220.

By using multiple carriers 210, each carrier 210 may be manufactured according to different processes, and several difficult-to-perform processes can be separated onto different devices that are later recombined to form the periscope assembly 100. For example, a first carrier 210*a* can include waveguides defined via lithographic processes, whereas a second carrier 210*b* can include waveguides defined via laser etching, where the two carriers 210 combine to form a periscope assembly 100 for use as an interposer between two photonic elements. In further example, when the periscope assembly 100 calls for the inclusion of optics 140 of a polarization filter and a phase shifter, each of which with individual yield rates, a fabricator may define a first carrier 210*a* without an optic 140, a second carrier 210*b* with a polarization filter optic 140, and a third carrier 210*c* with a phase shifter optic 140, and combine the three carriers to for the periscope assembly 100 with the desired optics 140.

In FIG. 2A the second waveguide interface 120*b* illustrates a direct coupling arrangement 200*a* (also referred to as a butt-coupling), in which a light path travels directly through a joint formed by the mating surface of the periscope assembly 100 and mating surface of the optical element 220. As illustrated, the periscope assembly 100 abuts the optical element 220, with mating surfaces perpendicular to the light path formed by the waveguides that carry optical signals between the periscope assembly 100 and the optical element 220. In the direct coupling arrangement 200*a*, the waveguides of the optical element 220 are linearly arranged to receive light via direct transmission from the waveguides of the periscope assembly 100. In various embodiments, lenses, filters, and surface treatments may be applied on the mating surfaces to aid in direct transfer of optical signals.

FIG. 2B illustrates an evanescent coupling arrangement 200*b* in which a mating surface of the periscope assembly 100 is connected to a mating surface of an optical element 220, and the light path through the periscope assembly 100 is not perpendicular to mating surfaces. Instead, the second waveguide interface 120*b* defines an evanescent region where the waveguides are incident to the mating surfaces, which evanescently transfers optical signals between the respective waveguides.

FIG. 2C illustrates a vertical coupling arrangement 200*c* in which the periscope assembly 100 is partially defined in the optical element 220. The light path through the periscope assembly 100 includes a first planar path 170*a* defined in the first and second carriers 210*a-b*, the first mirror 150*a*, and a portion of the intersecting path 180. The optical element 220 includes the remaining portion of the intersecting path 180, the second mirror 150*b*, and the second planar path 170*b*. The second waveguide interface 120*b* is defined between the mating surfaces of the second carrier 210*b* and the optical element 220 where the portions of the intersecting path 180 meet.

FIGS. 3A-3G illustrate various constructions for a periscope assembly 100 using a third carrier 210*c* defining some or all of the intersecting path 180, according to embodiments of the present disclosure. As will be appreciated, because FIGS. 3A-3G are presented in cross-sectional views (e.g., in the z-x plane), a fabricator may employ several of the illustrated constructions at different positions (e.g., along the y axis) in a single periscope assembly 100. Similarly, a periscope assembly 100 may omit a third carrier 210*c* that includes at least a portion of the intersecting path 180 in some cross-sectional planes while including such a third carrier 210*c* in a different cross-sectional plane.

In each of FIGS. 3A-3G, various intersect cavities 310 (individually, first intersect cavity 310*a*, second intersect cavity 310*b*, third intersect cavity 310*c*, etc.) are defined to accept the insertion of a third carrier 210*c* therein. The intersect cavities 310 may be defined in any of the first carrier 210*a*, second carrier 210*b*, and/or optical element 220 that the periscope assembly 100 is connected to, and are sized and shaped according to the size and shape of the third carrier 210*c*. In various embodiments, the walls defining the cavities 310 and/or the sides of the third carrier 210*c* can include various surface treatments (e.g., to reduce reflection at interfaces) and channels (e.g., to allow the application of an epoxy to secure the third carrier 210*c* in the intersect cavities 310). In various embodiments, the intersect cavities 310 are formed at the same time or as part of the same process as forming the carriers 210 in which they are defined, while in some embodiments, the intersect cavities 310 are formed after the carriers 210 are formed (e.g., as a retrofit process to add an optic 140).

In some embodiments, the intersect cavities 310 defined in various carriers 210 or optical elements 220 are aligned with one another and can use the third carrier 210*c*, when inserted therein, to act as an alignment feature for the construction of the periscope assembly 100. In some embodiments, the periscope assembly 100 also includes, defined on the first and second carriers 210*a-b*, alignment features that include alignment pins 320 and paired alignment cavities 330. For example, a first carrier 210*a* can define a first alignment pin 320*a* and a first alignment cavity 330*a*, and the second carrier 210*b* can define a second alignment pin 320*b* and a second alignment cavity 330*b*, where the first alignment pin 320*a* aligns with the second alignment cavity 330*b* and the second alignment pin 320*b* aligns with the first alignment cavity 330*a*. The alignment features help ensure that the first carrier 210*a* and the second carrier 210*b* are positioned correctly relative to one another to ensure that the light path from the light inputs 110 to the light outputs 160 are properly aligned and that the physical components (e.g., interlocks, waveguide interfaces 120) are also properly aligned. In various embodiments, more or fewer alignment features (including none) can be used than are illustrated in the present figures.

In each of FIGS. 3A-3G, a first waveguide 340*a* (generally, waveguide 340) is defined in a first carrier 210*a* to define at least a portion of the first planar path 170*a*, and a second waveguide is defined in a second carrier 210*b* to define at least a portion of the second planar path 170*b*, but how those planar paths 170 are linked via the intersecting path 180 can vary.

Figure 3A:
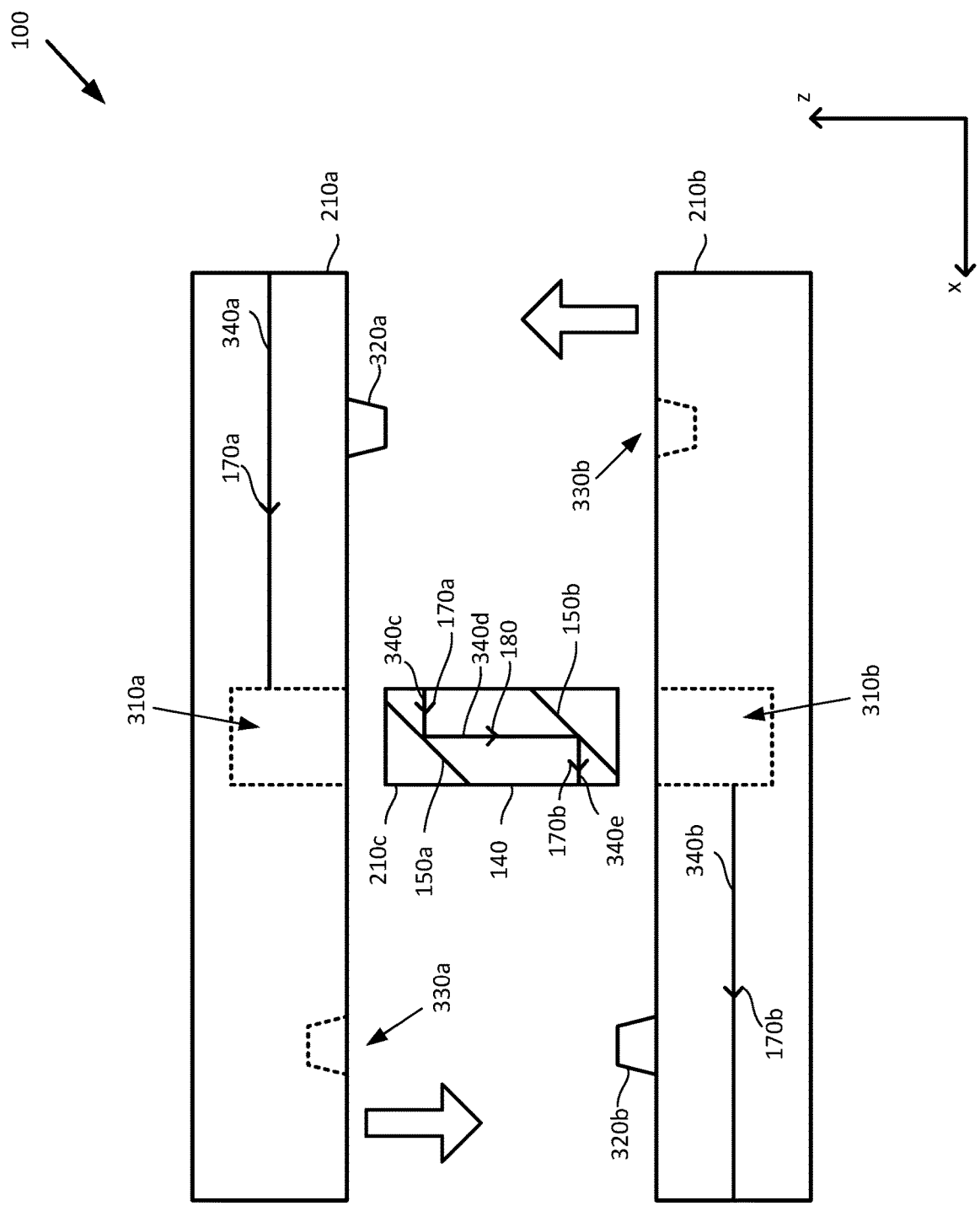
FIGS. 3A-3G illustrate various constructions for a periscope assembly using a third carrier defining some or all of the intersecting path, according to embodiments of the present disclosure.

In FIG. 3A, the third carrier 210*c* defines a third waveguide 340*c*, a first mirror 150*a*, a fourth waveguide 340*d*, a second mirror 150*b*, and a fifth waveguide 340*e*. In various embodiments, the third carrier 210*c* includes one or more optics 140 (e.g., a pre-mirror optic 140*a*, a post-mirror optic 140*b*, or a mid-mirror optic 140*c*). The first carrier 210*a* defines a first intersect cavity 310*a* and the second carrier 210*b* defines a second intersect cavity 310*b* with openings transverse to the intersecting path 180 and into which the third carrier 210*c* can be inserted. When the third carrier 210*c* is disposed in the first and second intersect cavities 310*a-b*, the third waveguide 340*c* is aligned with the first waveguide 340*a* to complete the first planar path 170*a* and the fifth waveguide 340*e* is aligned with the second waveguide 340*b* to complete the second planar path 170*b*.

Figure 3B:
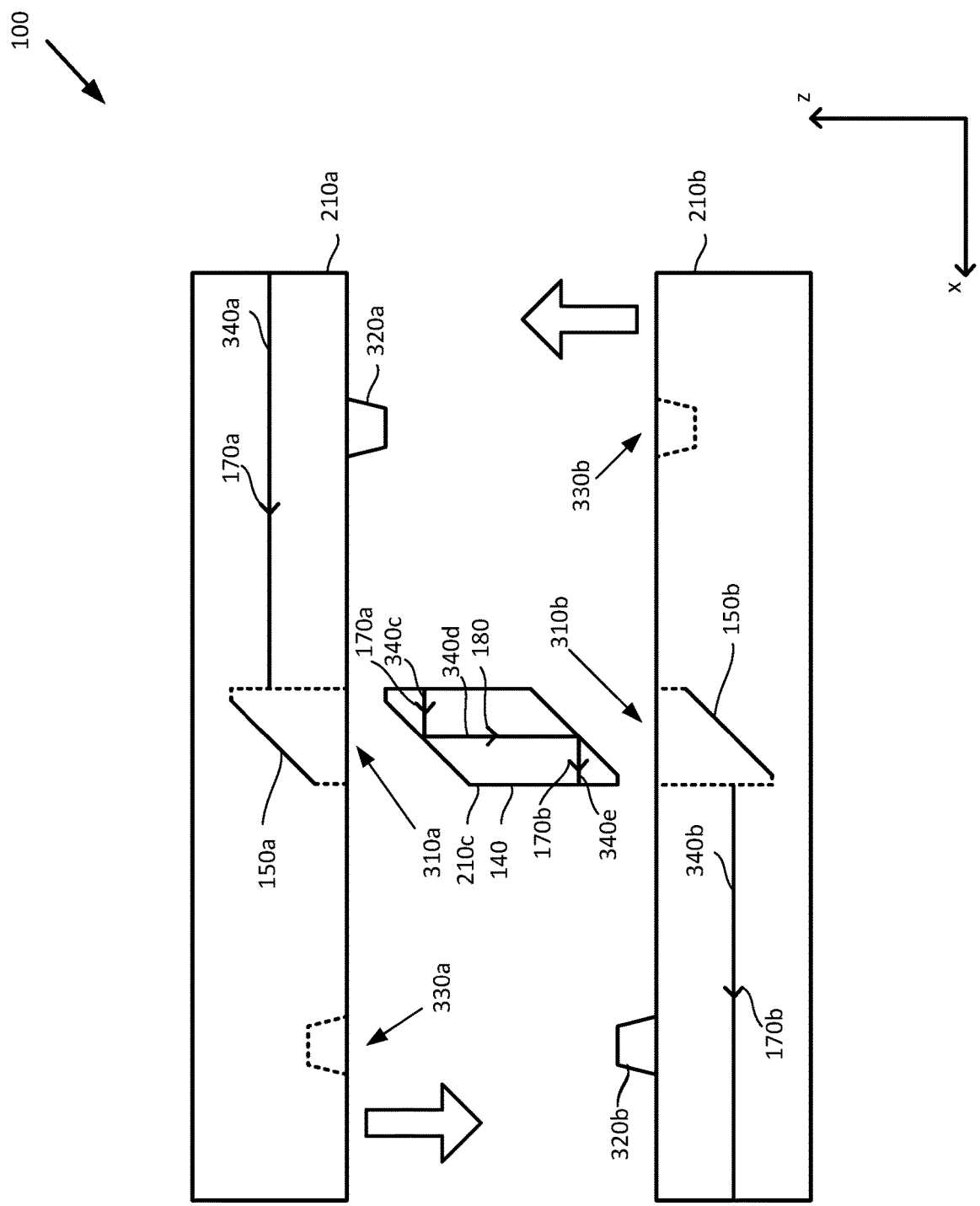

In FIG. 3B, the third carrier 210*c* defines a third waveguide 340*c*, a fourth waveguide 340*d*, and a fifth waveguide 340*e*. The first carrier 210*a* defines a first mirror 150*a* and the second carrier 210b defines a second mirror 150b. In various embodiments, the third carrier 210c includes one or more optics 140 (e.g., a pre-mirror optic 140a, a post-mirror optic 140b, or a mid-mirror optic 140c). The first carrier 210a defines a first intersect cavity 310a and the second carrier 210b defines a second intersect cavity 310b with openings transverse to the intersecting path 180 and into which the third carrier 210c can be inserted. When the third carrier 210c is disposed in the first and second intersect cavities 310a-b, the third waveguide 340c is aligned with the first waveguide 340a to complete the first planar path 170a and the fifth waveguide 340e is aligned with the second waveguide 340b to complete the second planar path 170b.

Figure 3C:
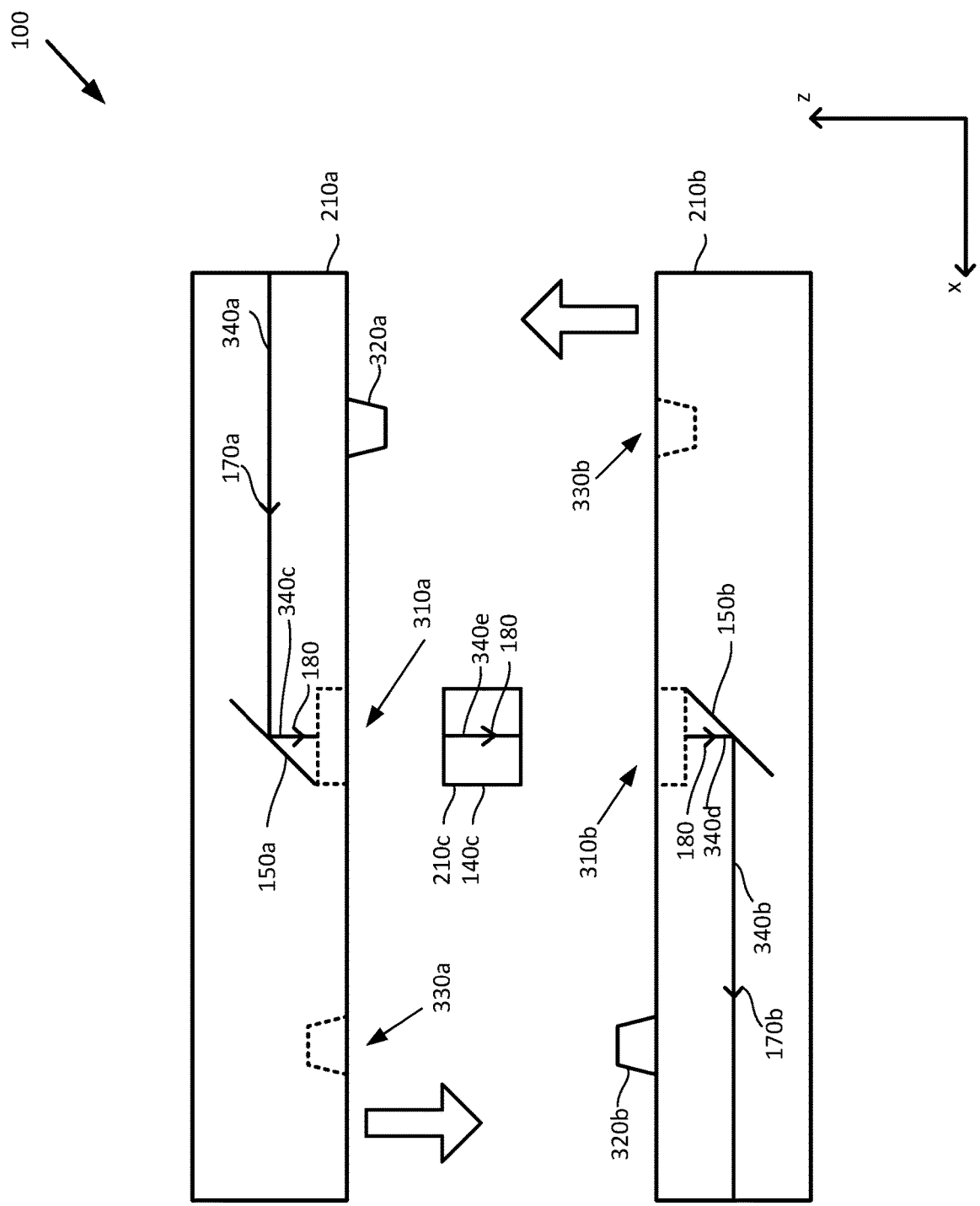

In FIG. 3C, the third carrier 210c defines a fifth waveguide 340e. The first carrier 210a defines a first mirror 150a and a third waveguide 340c that defines a portion of the intersecting path 180, and the second carrier 210b defines a second mirror 150b and a fourth waveguide 340d that defines a portion of the intersecting path 180. In various embodiments, the third carrier 210c includes one or more optics 140 (e.g., a mid-mirror optic 140c). The first carrier 210a defines a first intersect cavity 310a and the second carrier 210b defines a second intersect cavity 310b with openings transverse to the intersecting path 180 and into which the third carrier 210c can be inserted. When the third carrier 210c is disposed in the first and second intersect cavities 310a-b, the third waveguide 340c, fourth waveguide 340d, and fifth waveguides 340e are aligned with one another to complete the first intersecting path 180.

Figure 3D:
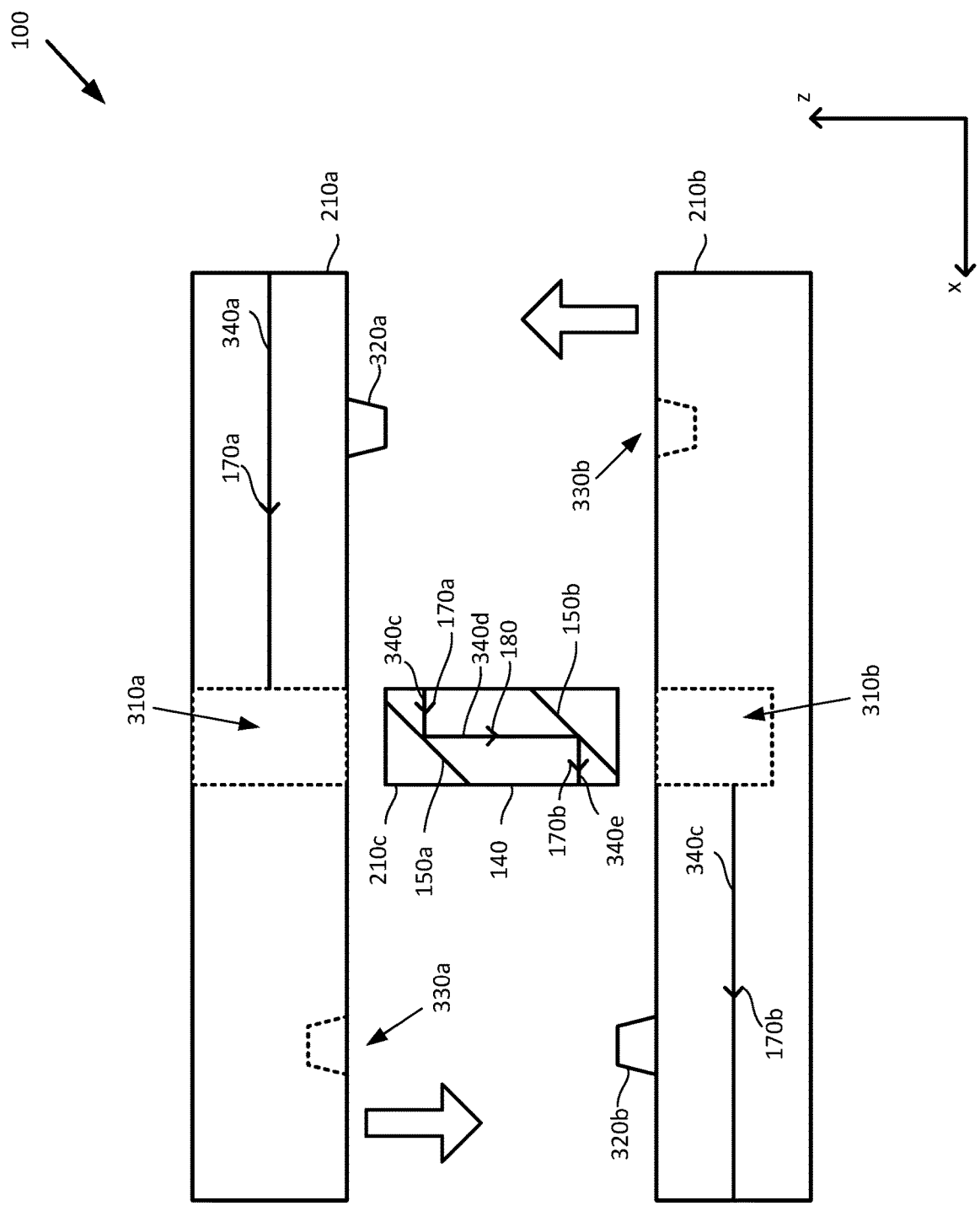

In FIG. 3D, the third carrier 210c defines a third waveguide 340c, a first mirror 150a, a fourth waveguide 340d, a second mirror 150b, and a fifth waveguide 340e. In various embodiments, the third carrier 210c includes one or more optics 140 (e.g., a pre-mirror optic 140a, a post-mirror optic 140b, or a mid-mirror optic 140c). The first carrier 210a defines a first intersect cavity 310a and the second carrier 210b defines a second intersect cavity 310b with openings transverse to the intersecting path 180 and into which the third carrier 210c can be inserted. The first intersect cavity 310a defines a first opening on a first plane shared with the opening of the second intersect cavity 310b (e.g., at the mating surface of the first carrier 210a and the second carrier 210b), and also defines a second opening on a second plane on the surface opposite to the mating surface of the first carrier 210a and the second carrier 210b. This second opening allows the fabricator to insert the third carrier 210c after the first carrier 210a and the second carrier 210b are connected with one another. When the third carrier 210c is disposed in the first and second intersect cavities 310a-b, the third waveguide 340c is aligned with the first waveguide 340a to complete the first planar path 170a and the fifth waveguide 340e is aligned with the second waveguide 340b to complete the second planar path 170b. In various embodiments, the third carrier 210c may completely fill the height of the first intersect cavity 310a, a spacer or cap (including a heatsink or thermal transfer material) may be inserted in the first intersect cavity 310a to close the second opening, or the second opening may remain open.

Figure 3E:
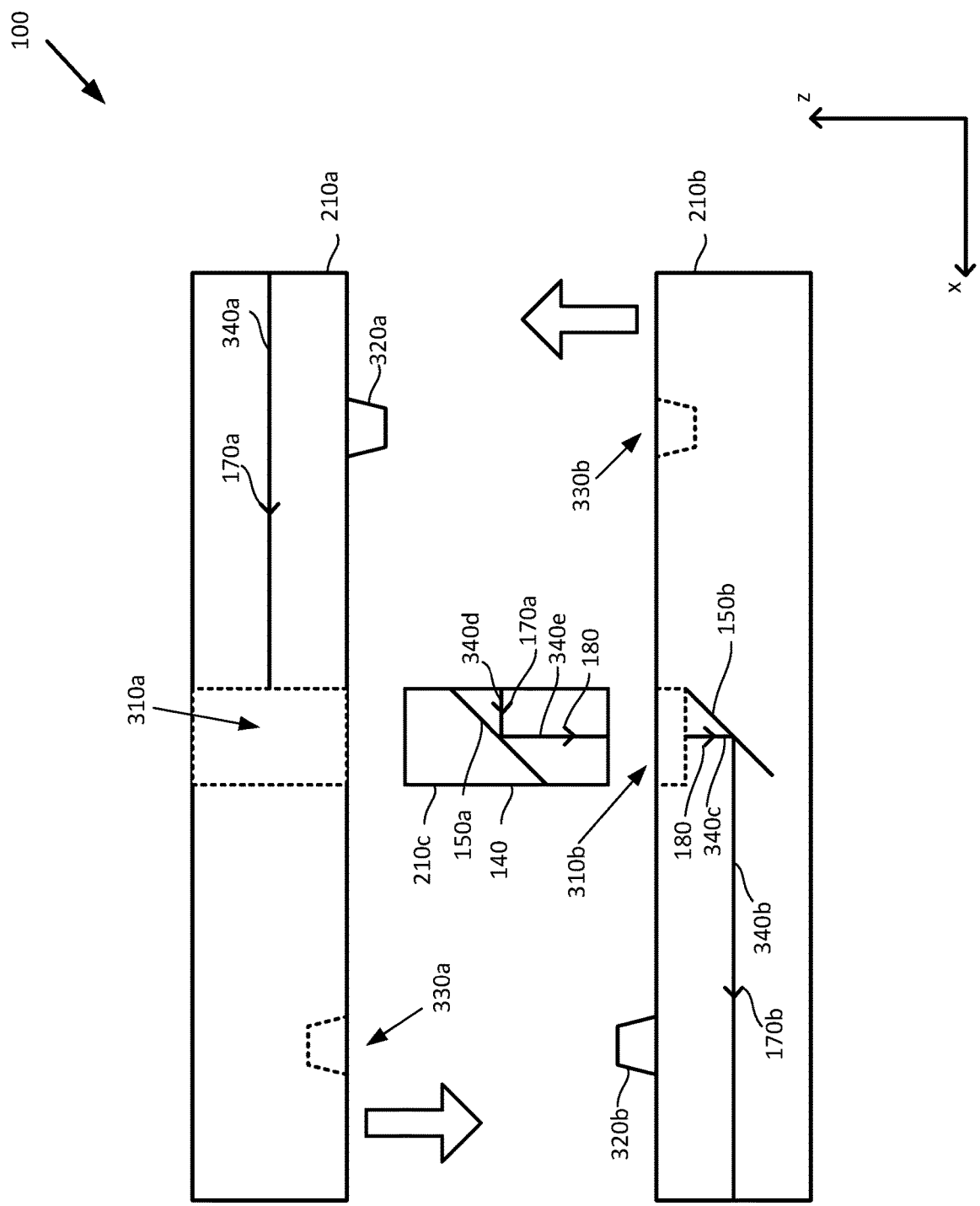

In FIG. 3E, the third carrier 210c defines a fourth waveguide 340d defining a portion of the first planar path 170a, a first mirror 150a, and a fifth waveguide 340e defining a portion of the intersecting path 180. The second carrier 210b defines a third waveguide 340c defining a portion of the intersecting path 180 and a second mirror 150b. In various embodiments, the third carrier 210c includes one or more optics 140 (e.g., a pre-mirror optic 140a or a mid-mirror optic 140c). The first carrier 210a defines a first intersect cavity 310a and the second carrier 210b defines a second intersect cavity 310b with openings transverse to the intersecting path 180 and into which the third carrier 210c can be inserted. The first intersect cavity 310a defines a first opening on a first plane shared with the opening of the second intersect cavity 310b (e.g., at the mating surface of the first carrier 210a and the second carrier 210b), and also defines a second opening on a second plane on the surface opposite to the mating surface of the first carrier 210a and the second carrier 210b. This second opening allows the fabricator to insert the third carrier 210c after the first carrier 210a and the second carrier 210b are connected with one another. When the third carrier 210c is disposed in the first and second intersect cavities 310a-b, the fourth waveguide 340d is aligned with the first waveguide 340a to complete the first planar path 170a and the fifth waveguide 340e is aligned with the third waveguide 340c to complete the intersecting path 180. In various embodiments, the third carrier 210c may completely fill the height of the first intersect cavity 310a, a spacer or cap (including a heatsink or thermal transfer material) may be inserted in the first intersect cavity 310a to close the second opening, or the second opening may remain open.

Figure 3F:
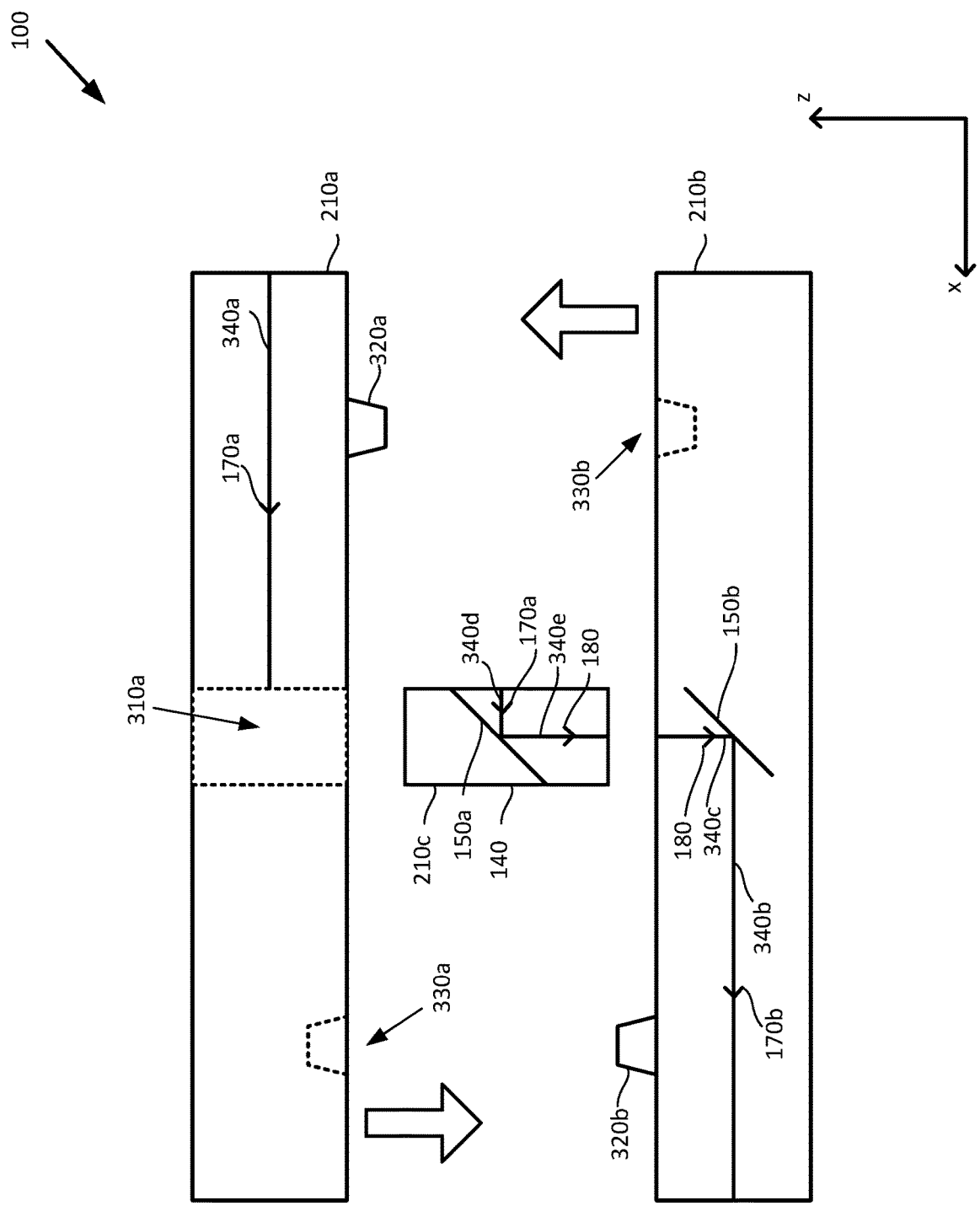

In FIG. 3F, the third carrier 210c defines a fourth waveguide 340d defining a portion of the first planar path 170a, a first mirror 150a, and a fifth waveguide 340e defining a portion of the intersecting path 180. The second carrier 210b defines a third waveguide 340c defining a portion of the intersecting path 180 and a second mirror 150b. In various embodiments, the third carrier 210c includes one or more optics 140 (e.g., a pre-mirror optic 140a or a mid-mirror optic 140c). The first carrier 210a defines a first intersect cavity 310a, with an opening transverse to the intersecting path 180 and into which the third carrier 210c can be inserted, but the second carrier 210b does not define an intersect cavity 310. The first intersect cavity 310a defines a first opening on a first plane shared with the opening of the second intersect cavity 310b (e.g., at the mating surface of the first carrier 210a and the second carrier 210b), and also defines a second opening on a second plane on the surface opposite to the mating surface of the first carrier 210a and the second carrier 210b. This second opening allows the fabricator to insert the third carrier 210c after the first carrier 210a and the second carrier 210b are connected with one another. When the third carrier 210c is disposed in the first intersect cavity 310a, the fourth waveguide 340d is aligned with the first waveguide 340a to complete the first planar path 170a and the fifth waveguide 340e is aligned with the third waveguide 340c to complete the intersecting path 180. In various embodiments, the third carrier 210c may completely fill the height of the first intersect cavity 310a, a spacer or cap (including a heatsink or thermal transfer material) may be inserted in the first intersect cavity 310a to close the second opening, or the second opening may remain open.

Figure 3G:
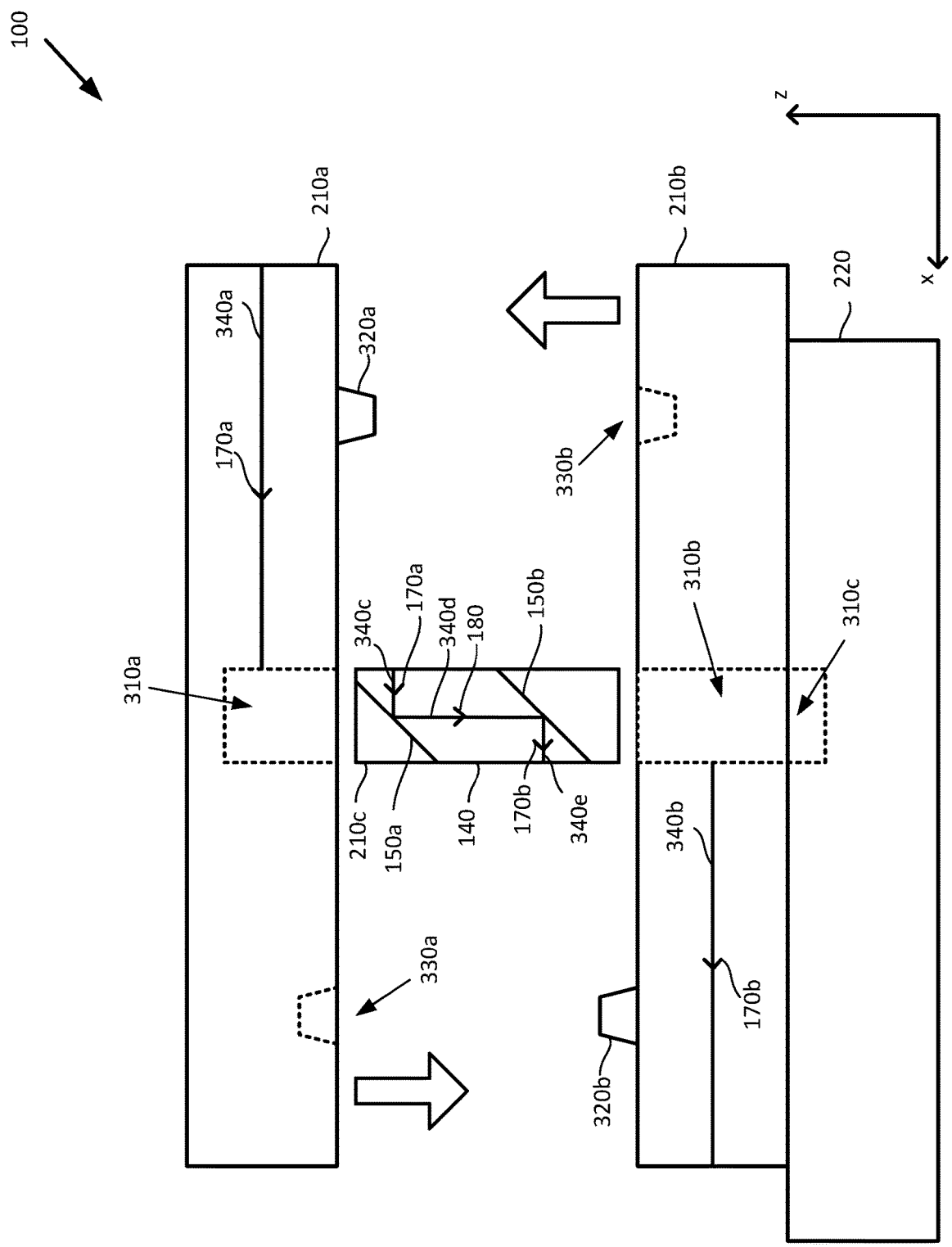

In FIG. 3G, the third carrier 210c defines a third waveguide 340c, a first mirror 150a, a fourth waveguide 340d, a second mirror 150b, and a fifth waveguide 340e. In various embodiments, the third carrier 210c includes one or more optics 140 (e.g., a pre-mirror optic 140a, a post-mirror optic 140b, or a mid-mirror optic 140c). The first carrier 210a defines a first intersect cavity 310a, the second carrier 210b defines a second intersect cavity 310b, and an optical element 220 defines a third intersect cavity 310c with openings transverse to the intersecting path 180 and into which the third carrier 210c can be inserted. When the third carrier 210c is disposed in the first and second intersect cavities 310a-b, the third waveguide 340c is aligned with the first waveguide 340a to complete the first planar path 170a and the fifth waveguide 340e is aligned with the second waveguide 340b to complete the second planar path 170b. Additionally, when the third carrier 210c is disposed in the first and second intersect cavities 310a-b, the third carrier 210c projects outward from the periscope assembly 100 and provides an alignment feature and/or attachment point with the optical element 220 paired with the third intersect cavity 310c.

FIGS. 4A-4I illustrate various constructions for a periscope assembly 100 using a structural insert 230, according to embodiments of the present disclosure. So as not to distract from the features and interactions of the structural inserts 230, FIGS. 4A-4I illustrate the third carrier 210c similar to that illustrated in FIG. 3A, although the structural inserts 230 may be used with any construction or permutation thereof discussed in the present disclosure. As will be appreciated, because FIGS. 4A-4I are presented in cross-sectional views (e.g., in the z-x plane), a fabricator may employ several of the illustrated constructions at different positions (e.g., along the y axis) in a single periscope assembly 100. Similarly, a periscope assembly 100 may omit a structural insert 230 in some cross-sectional planes while including structural inserts 230 in different cross-sectional planes In each of FIGS. 4A-4I, a first intersect cavity 310a and second intersect cavity 310b are defined in the respective first carrier 210a and second carrier 210b to accept the insertion of a third carrier 210c therein. In various embodiments, the walls defining the cavities 310 and/or the sides of the third carrier 210c can include various surface treatments (e.g., to reduce reflection at interfaces) and channels (e.g., to allow the application of an epoxy to secure the third carrier 210c in the intersect cavities 310). In various embodiments, the intersect cavities 310 are formed at the same time or as part of the same process as forming the carriers 210 in which they are defined, while in some embodiments, the intersect cavities 310 are formed after the carriers 210 are formed (e.g., as a retrofit process to add an optic 140).

In some embodiments, the intersect cavities 310 defined in various carriers 210 are aligned with one another and can use the third carrier 210c, when inserted therein, to act as an alignment feature for the construction of the periscope assembly 100. In some embodiments, the periscope assembly 100 also includes, defined on the first and second carriers 210a-b, alignment features that include alignment pins 320 and paired alignment cavities 330. For example, a first carrier 210a can define a first alignment pin, and the second carrier 210b can define a first alignment cavity 330a (or vice versa), where the first alignment pin 320a aligns the first alignment cavity 330a. The alignment features help ensure that the first carrier 210a and the second carrier 210b are positioned correctly relative to one another to ensure that the light path from the light inputs 110 to the light outputs 160 are properly aligned and that the physical components (e.g., interlocks, waveguide interfaces 120) are also properly aligned.

In each of FIGS. 4A-4I, a first waveguide 340a (generally, waveguide 340) is defined in a first carrier 210a to define a portion of the first planar path 170a, and a second waveguide 340b is defined in a second carrier 210b to define a portion of the second planar path 170b. The third carrier 210c defines a third waveguide 340c, a first mirror 150a, a fourth waveguide 340d, a second mirror 150b, and a fifth waveguide 340e. In various embodiments, the third carrier 210c includes one or more optics 140 (e.g., a pre-mirror optic 140a, a post-mirror optic 140b, or a mid-mirror optic 140c). The first carrier 210a defines a first intersect cavity 310a and the second carrier 210b defines a second intersect cavity 310b with openings transverse to the intersecting path 180 and into which the third carrier 210c can be inserted. When the third carrier 210c is disposed in the first and second intersect cavities 310a-b, the third waveguide 340c is aligned with the first waveguide 340a to complete the first planar path 170a and the fifth waveguide 340e is aligned with the second waveguide 340b to complete the second planar path 170b.

In addition to the alignment features provided by the paired insertion cavities and third carrier 210c and/or the paired alignment pins 320 and alignment cavities 330, the first carrier 210a, second carrier 210b, and optical element 220 define various structural cavities 410 (e.g. a first structural cavity 410a, a second structural cavity 410b, a third structural cavity 410c, etc.) to at least partially accept a structural insert 230. Depending on the size, shape, and time/method of incorporation of the structural insert 230 in the periscope assembly 100, the structural cavities 410 may take various forms.

Figure 4A:
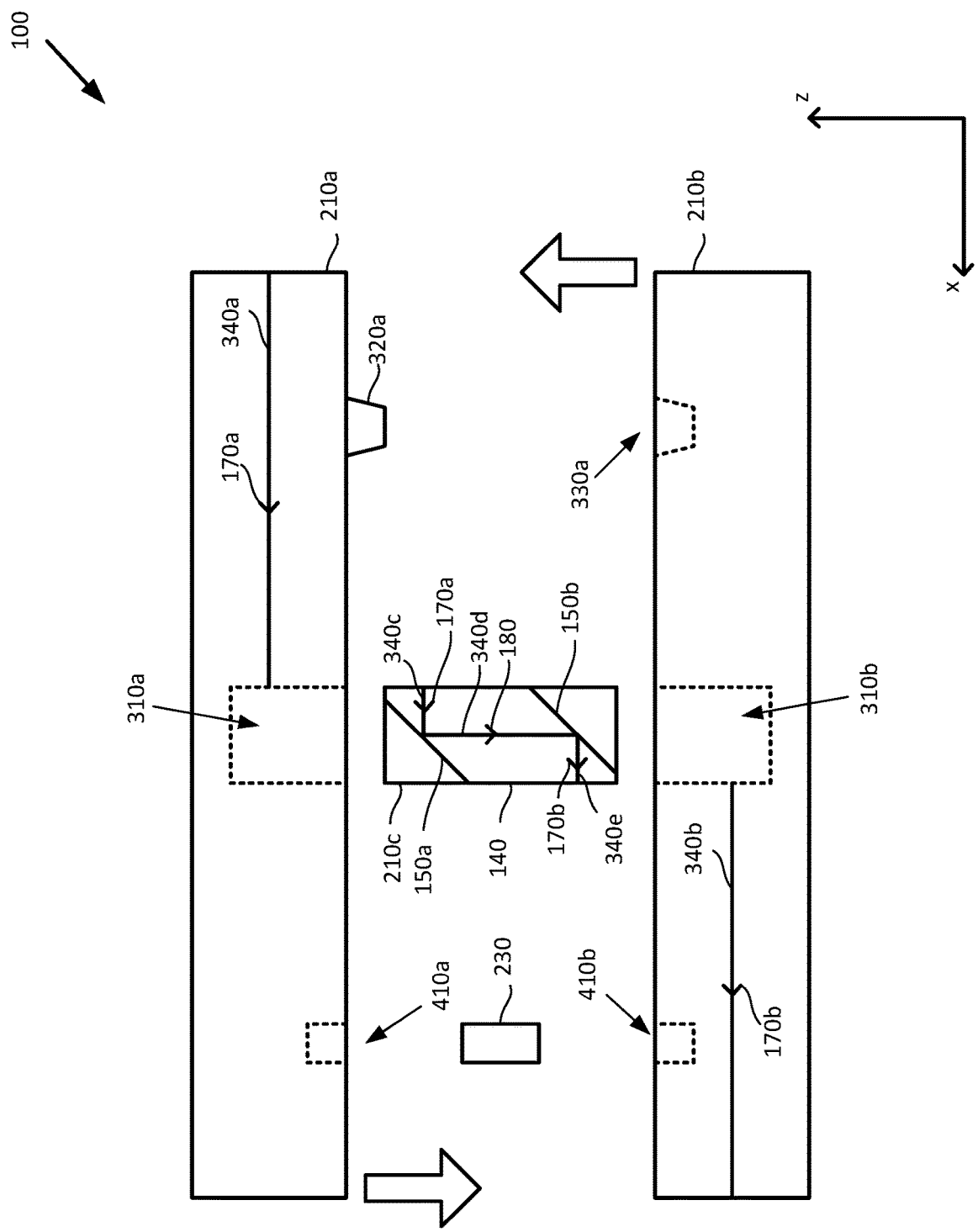
Figure 4B:
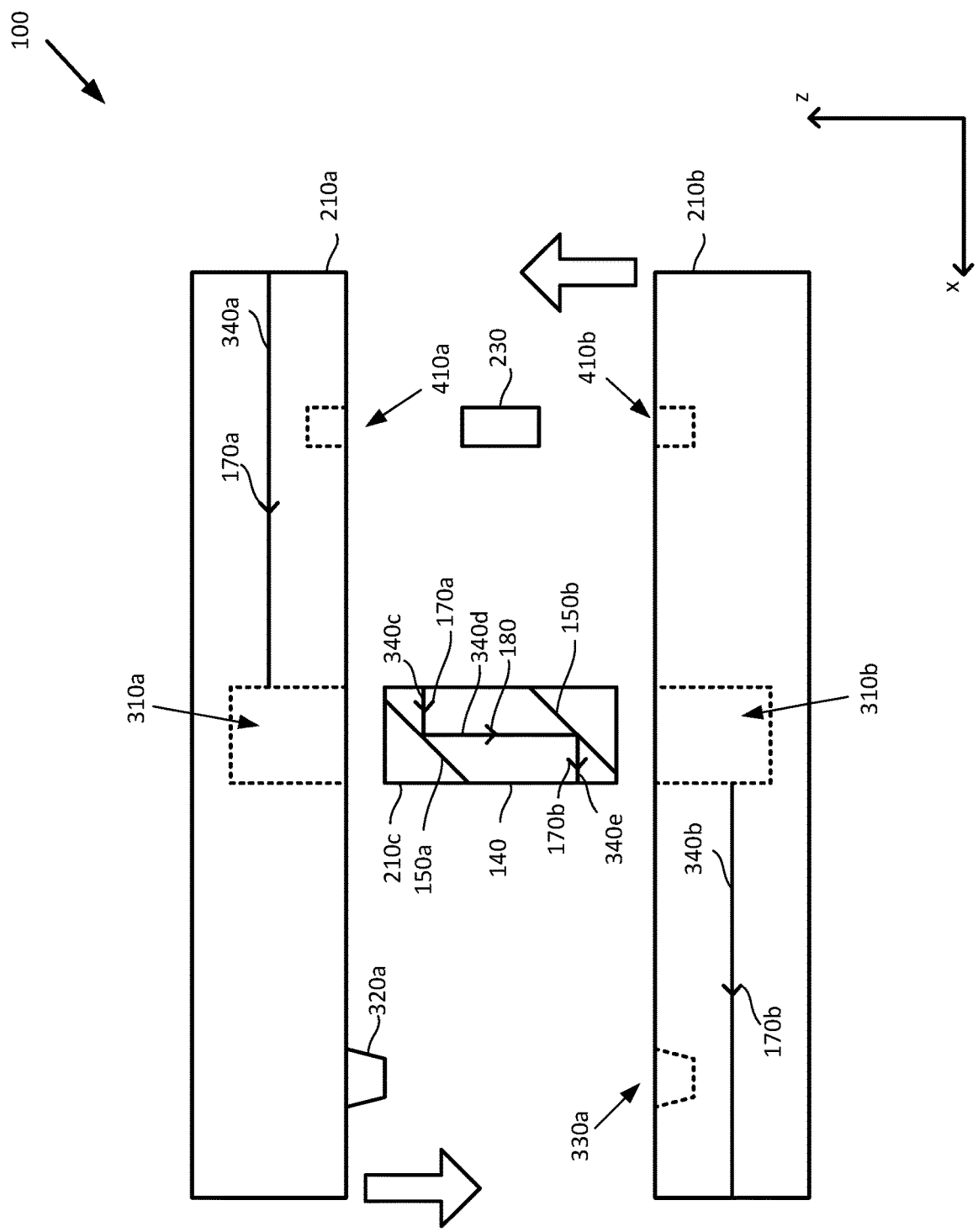
Figure 4C:
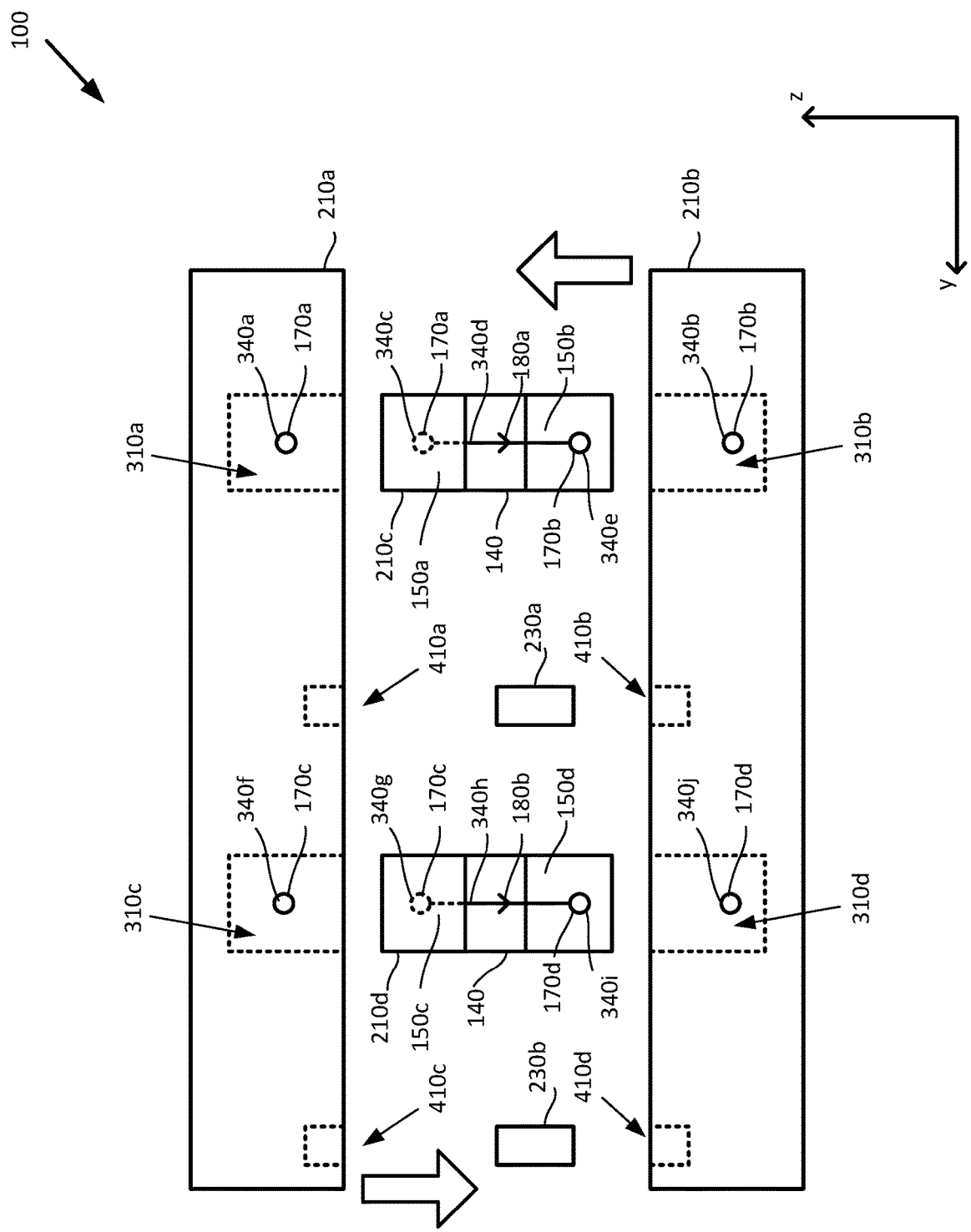

In FIGS. 4A-4C, the structural insert 230 is captured between the mating surfaces of the first carrier 210a and the second carrier 210b in the respective first structural cavity 410a and the second structural cavity 410b. The structural cavities 410 may be defined on any side relative to the intersecting path 180 (e.g., output-wise as in FIG. 4A, input-wise of FIG. 4C, or side-wise as in FIG. 4C) as long as the structural insert is outside of the light path. In various embodiments, the structural cavities 410 are defined in a shared plane with the light path, but do not extend to a depth/height to sufficient to interfere with the light path. For example, a waveguide 340 may be defined in the same xz-plane as a structural cavity 410, but begins at a height $Z_1$ in the z-axis, whereas the structural cavity 410 extends to a height $Z_2$ that is less than $Z_1$ from a shared reference point.

In FIG. 4C, which is shown as a cross-section in the yz-plane, illustrates that several carriers 210 can be inserted between the first carrier 210a and the second carrier 210b, and that structural inserts 230 can be inserted coplanar with the inserted carriers 210. For example, a first structural insert 230a can be inserted into a first structural cavity 410a defined between a first intersect cavity 310a and a third intersect cavity 310c in the first carrier 210a and a second structural cavity 410b defined between a second intersect cavity 310b and a fourth intersect cavity 310d in the second carrier 210b. In a further example, a second structural insert 230b can be inserted into a third structural cavity 410c defined to one side of the first carrier 210a and a fourth structural cavity 410d defined to one side the second carrier 210b.

In FIG. 4C, the first planar path 170a and the second planar path 170b (in the first carrier 210a, second carrier 210b, and third carrier 210c) are shown as projecting into/out of the page. Similarly, the third planar path 170c (including the sixth waveguide 340f and seventh waveguide 340g) and the fourth planar path 170d (including the ninth waveguide 340i and tenth waveguide 340j) are shown projecting into/out of the page. The fourth carrier 210d includes a third mirror 150c and a fourth mirror 150d between which an eighth waveguide 340h defining a second intersecting path 180b is defined, in the same plane as the first intersecting path 180a defined in the third carrier 210c. In various embodiments, the third and fourth carrier 210c-d can include various optics 140, which may be the same as one another or different.

Figure 4D:
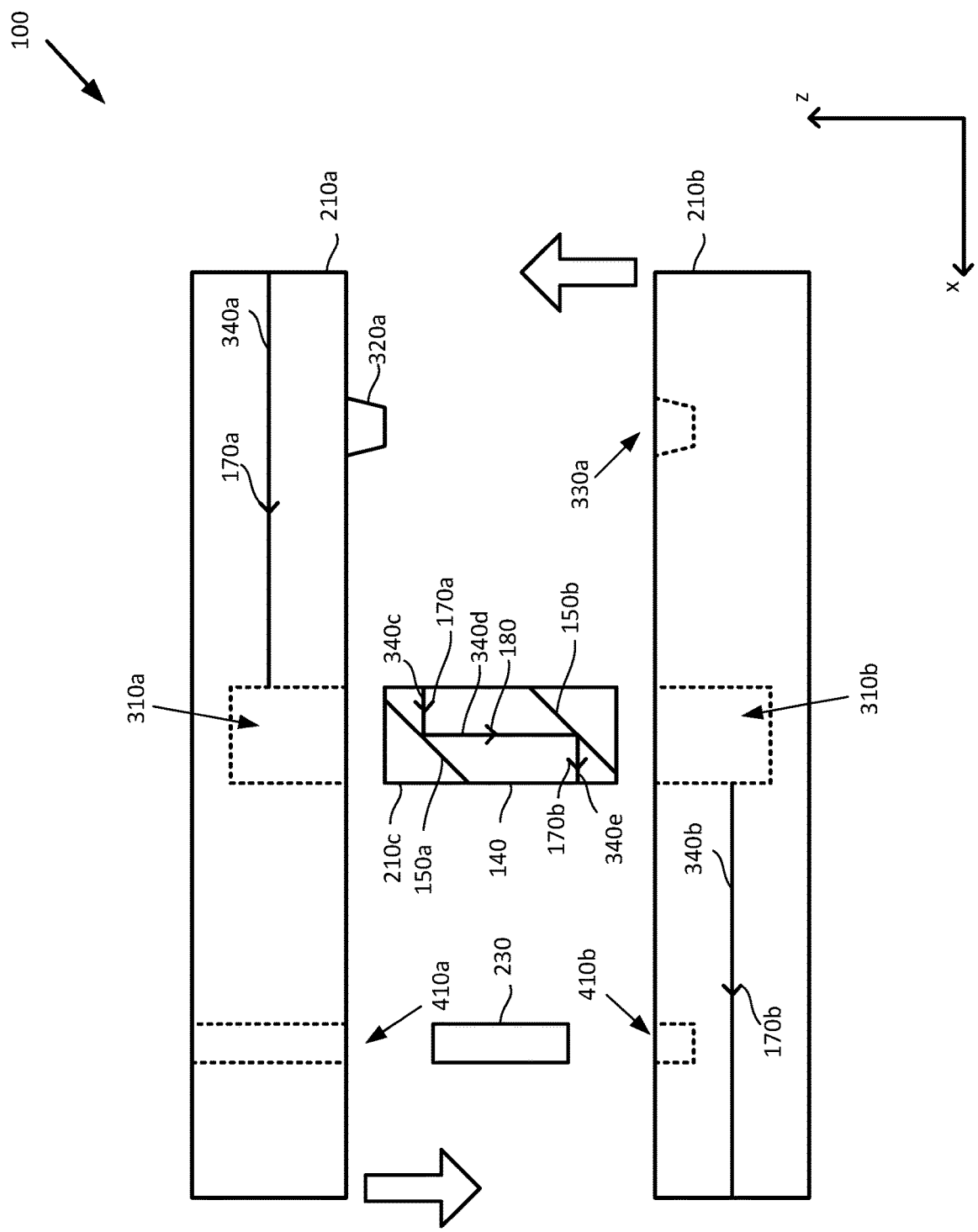

In FIG. 4D, the first carrier 210a defines a first structural cavity 410a and the second carrier 210b defines a second structural cavity 410b with openings transverse to the intersecting path 180 and into which the structural insert 230 can be inserted. The first structural cavity 410a defines a first opening on a first plane shared with the opening of the second structural cavity 410b (e.g., at the mating surface of the first carrier 210a and the second carrier 210b), and also defines a second opening on a second plane on the surface opposite to the mating surface of the first carrier 210a and the second carrier 210b. This second opening allows the fabricator to insert the structural insert 230 after the first carrier 210a and the second carrier 210b are connected with one another. In various embodiments, the structural insert 230 may completely fill the height of the first structural cavity 410a, a spacer or cap (including a heatsink or thermal transfer material) may be inserted in the first structural cavity 410a to close the second opening, or the second opening may remain open.

Figure 4E:
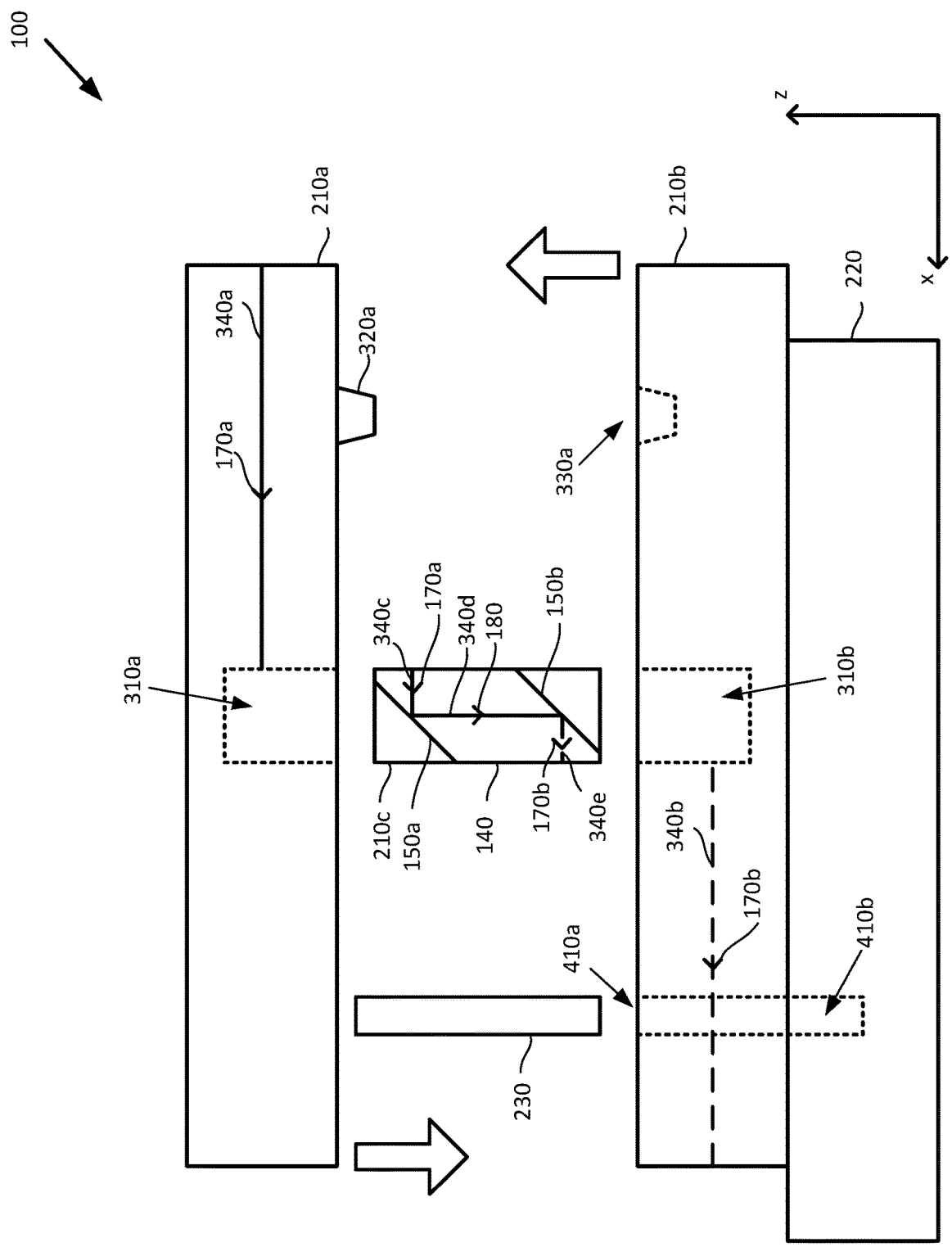

In FIG. 4E, the second carrier 210b defines a first structural cavity 410a and an optical element 220 defines a second structural cavity 410b with openings transverse to the intersecting path 180 and into which the structural insert 230 can be inserted. The first structural cavity 410a defines a first opening on a first plane shared with the opening of the second structural cavity 410b (e.g., at the mating surface of the second carrier 210b and the optical element 220), and also defines a second opening on a second plane on the mating surface of the first carrier 210a and the second carrier 210b. In various embodiments, the structural insert 230 may completely fill the height of the first structural cavity 410a, a spacer or cap may be inserted in the first structural cavity 410a to close the second opening, or a portion of the first structural cavity 410a may remain unfilled (being closed by the mating surface of the first carrier 210a).

In FIG. 4F, the first carrier 210a defines a first structural cavity 410a, the second carrier 210b defines a second structural cavity 410b, and the optical element 220 defines a third structural cavity 410c; each with openings transverse to the intersecting path 180 and into which the structural insert 230 can be inserted. The second structural cavity 410b defines a first opening on a first plane shared with the opening of the first structural cavity 410a (e.g., at the mating surface of the first carrier 210a and the second carrier 210b) and a second opening on a second plane shared with the opening of the third structural cavity 410c (e.g., at the mating surface of the second carrier 210b and the optical element 220). The two openings in the second structural cavity 410b allow the fabricator to insert the structural insert 230 through the second carrier 210b and into both the first carrier 210a and the optical element 220 and thereby provide structural support and/or alignment for the shared photonic platform integrating the periscope assembly 100 and the optical element 220.

Figure 4G:
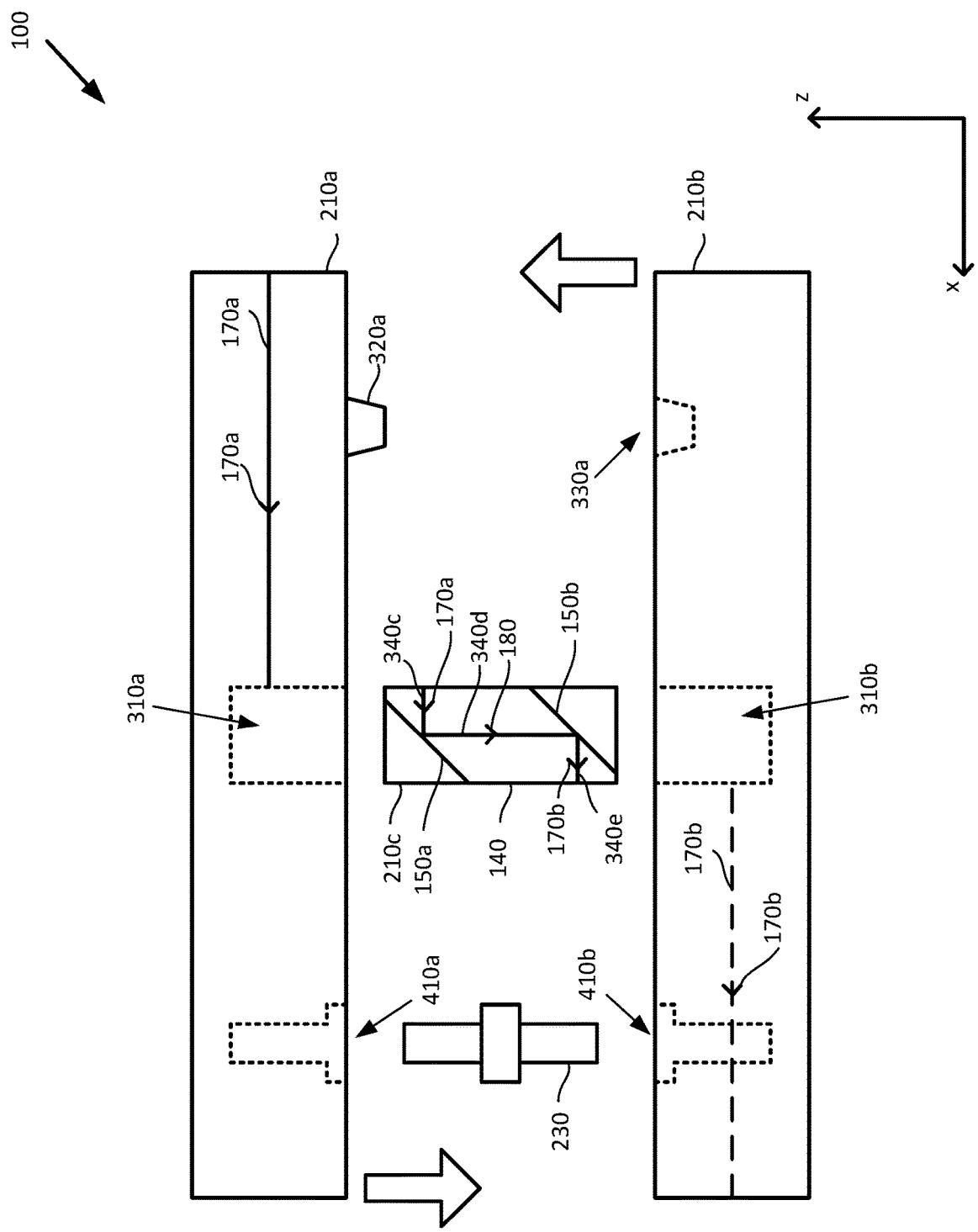

In FIG. 4G, the structural insert 230 is captured between the mating surfaces of the first carrier 210a and the second carrier 210b in the respective first structural cavity 410a and the second structural cavity 410b. The structural insert 230 may include various shapes that are designed to engage the structural cavities 410 and secure the carriers 210 in various planes of movement.

The second planar path 170b in FIGS. 4E-4G is illustrated as a dashed line, indicating that although a structural cavity 410 extends to the same height/depth as the second planar path 170b, the structural cavities 410 are defined in a different plane than the second planar path 170b, and thus do not interfere with the transmission of optical signals thereon.

Figure 4H:
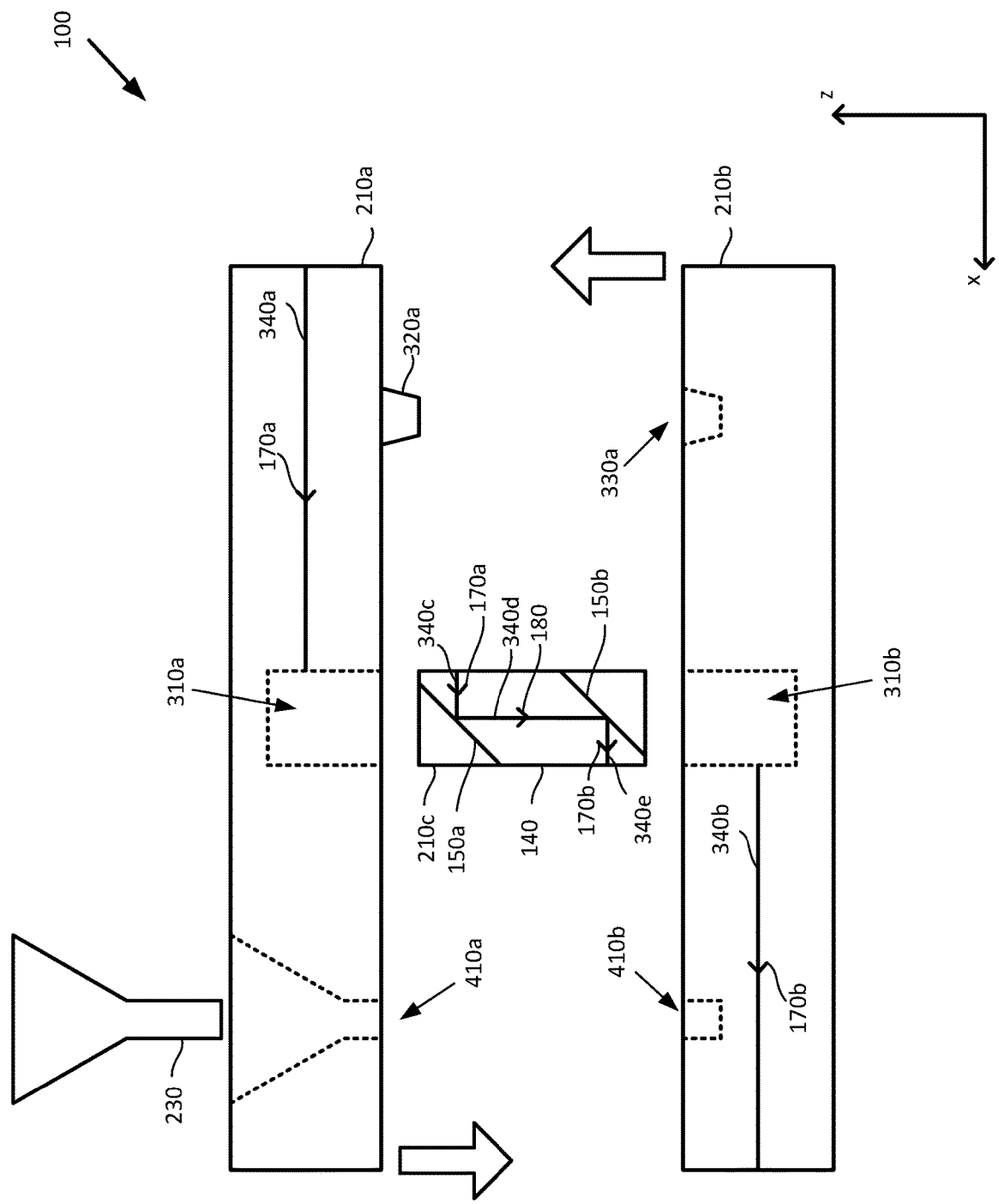

In FIG. 4H, the first carrier 210a defines a first structural cavity 410a and the second carrier 210b defines a second structural cavity 410b with openings transverse to the intersecting path 180 and into which the structural insert 230 can be inserted. The first structural cavity 410a defines a first opening on a first plane shared with the opening of the second structural cavity 410b (e.g., at the mating surface of the first carrier 210a and the second carrier 210b), and also defines a second opening on a second plane on the surface opposite to the mating surface of the first carrier 210a and the second carrier 210b. This second opening allows the fabricator to insert the structural insert 230 after the first carrier 210a and the second carrier 210b are connected with one another. In various embodiments, the structural insert 230 may be shaped to include self-alignment features to improve the ease and/or precision at which the structural insert 230 is placed into the structural cavities.

Figure 4I:
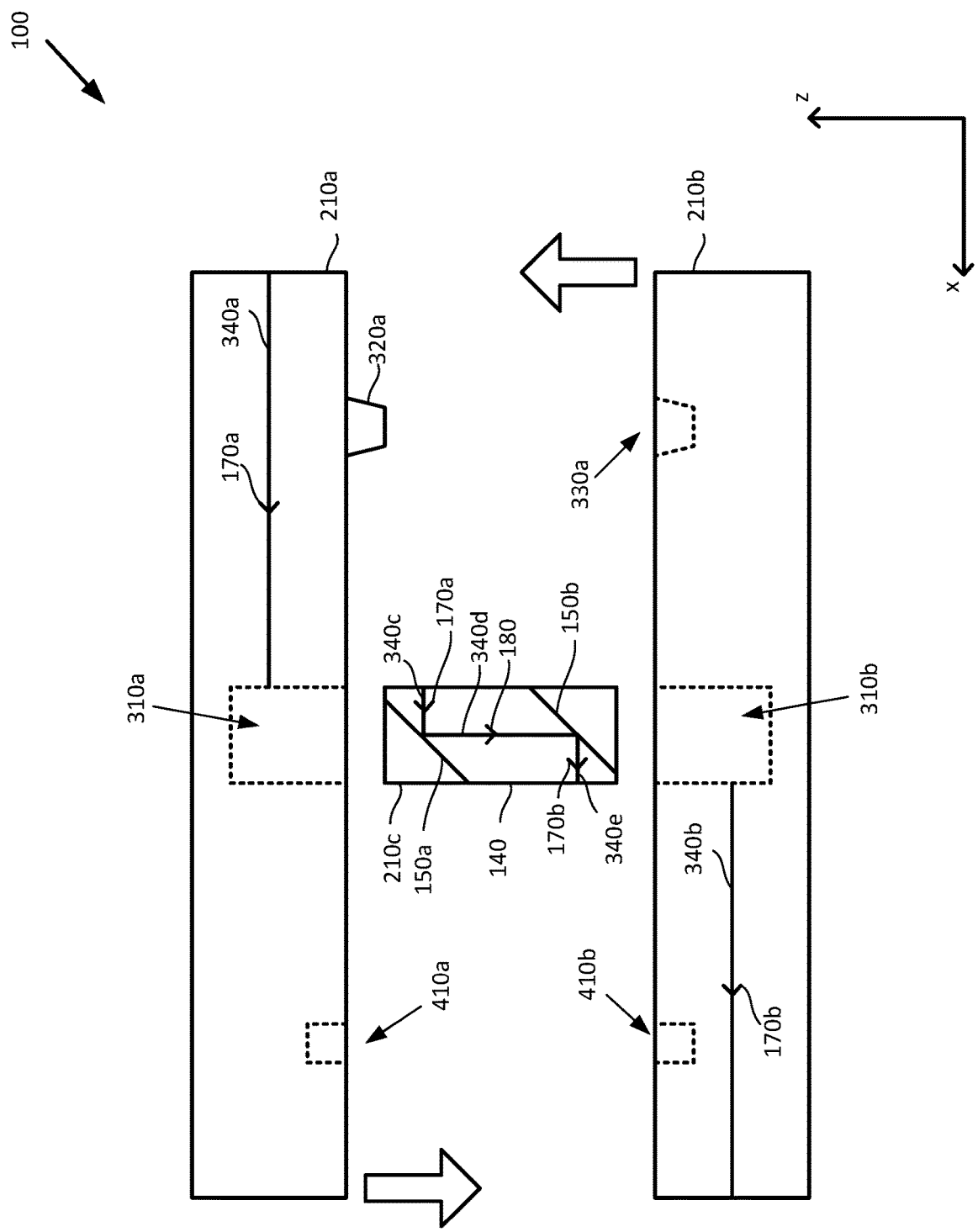

In FIG. 4I, the first carrier 210a defines a first structural cavity 410a and the second carrier 210b defines a second structural cavity 410b with openings transverse to the intersecting path 180 and into which the structural insert 230 can be inserted—or the structural cavities 410 may remain unfilled. In various embodiments, a pair of structural cavities 410 with openings facing one another may be left void or unfilled to provide a thermal expansion/contraction joint in the periscope assembly 100, to provide a potential insertion point for a structural insert 230 (e.g., as an (unused) option in a standardized mold), to act as a reference point for a vision system for aligning components, or as a flow channel for a chemical etchant or epoxy.

FIGS. 5A-5D illustrate various constructions for a periscope assembly 100 using a third carrier 210c defining some of the first planar path 170a and a fourth carrier define some of the second planar path 170b, according to embodiments of the present disclosure. So as not to distract from the features and interactions of the third and fourth carriers 210c-d defining portions of the planar paths 170, FIGS. 5A-5D illustrate first carrier 210a and the second carrier 210b collectively defining all of the intersecting path 180, although the third and fourth carriers 210c-d may be used with any construction or permutation thereof discussed in the present disclosure. As will be appreciated, because FIGS. 5A-5D are presented in cross-sectional views (e.g., in the z-x plane), a fabricator may employ several of the illustrated constructions at different positions (e.g., along the y axis) in a single periscope assembly 100.

In addition to or instead of using a third (or subsequent) carrier 210c to insert an optic 140 in the intersecting path 180, a fabricator may use one or more additional carriers 210 to insert pre-mirror optics 140a into the first planar path 170a and/or insert post-mirror optics 140b into the second planar path 170b.

In each of FIGS. 5A-5D, various planar cavities 510 (individually, first planar cavity 510a, second planar cavity 510b, third planar cavity 510c, etc.) are defined to accept the insertion of a carrier 210 therein to insert the carrier in the associated planar path 170. The planar cavities 510 may be defined in any of the first carrier 210a, second carrier 210b, and/or optical element 220 that the periscope assembly 100 is connected to, and are sized and shaped according to the size and shape of the carrier 210 intended for insertion therein. In various embodiments, the walls defining the planar cavities 510 and/or the sides of the carrier 210 to insert can include various surface treatments (e.g., to reduce reflection at interfaces) and channels (e.g., to allow the application of an epoxy to secure the carrier 210 in the planar cavities 510). In various embodiments, the planar cavities 510 are formed at the same time or as part of the same process as forming the carriers 210 in which they are defined, while in some embodiments, the planar cavities 510 are formed after the carriers 210 are formed (e.g., as a retrofit process to add an optic 140).

In some embodiments, the planar cavities 510 defined in various carriers 210 or optical elements 220 are aligned with one another and can use the inserted carriers 210, when inserted therein, to act as an alignment feature for the construction of the periscope assembly 100. In some embodiments, the periscope assembly 100 also includes, defined on the first and second carriers 210a-b, alignment features that include alignment pins 320 and paired alignment cavities 330. For example, a first carrier 210a can define a first alignment pin 320a and a first alignment cavity 330a, and the second carrier 210b can define a second alignment pin 320b and a second alignment cavity 330b, where the first alignment pin 320a aligns with the second alignment cavity 330b and the second alignment pin 320b aligns with the first alignment cavity 330a. The alignment features help ensure that the first carrier 210a and the second carrier 210b are positioned correctly relative to one another to ensure that the light path from the light inputs 110 to the light outputs 160 are properly aligned and that the physical components (e.g., interlocks, waveguide interfaces 120) are also properly aligned.

In each of FIGS. 5A-5D, the first carrier 210a includes a first waveguide 340a and a second waveguide 340b that partially define the first planar path 170a, and includes a third waveguide 340c that partially defines the intersecting path 180. The second carrier 210b includes a third waveguide 340c that partially defines the intersecting path 180, and includes a fourth waveguide 340d and a fifth waveguide 340e that partially define the second planar path 170b. The first carrier 210a includes a first mirror 150a that optically couples the second waveguide 340b with the third waveguide 340c, and the second carrier 210b includes a second mirror 150b that optically couples the fourth waveguide 340d with the fifth waveguide 340e. When the first carrier 210a and the second carrier 210b are aligned and joined together, the third waveguide 340c and the fourth waveguide 340d are aligned to complete the intersecting path 180. In various embodiments, various surface treatments can be applied to the mating surfaces of the first and second carriers 210a-b to improve or condition the light transmission between the third and fourth waveguides 340c-d.

Figure 5A:
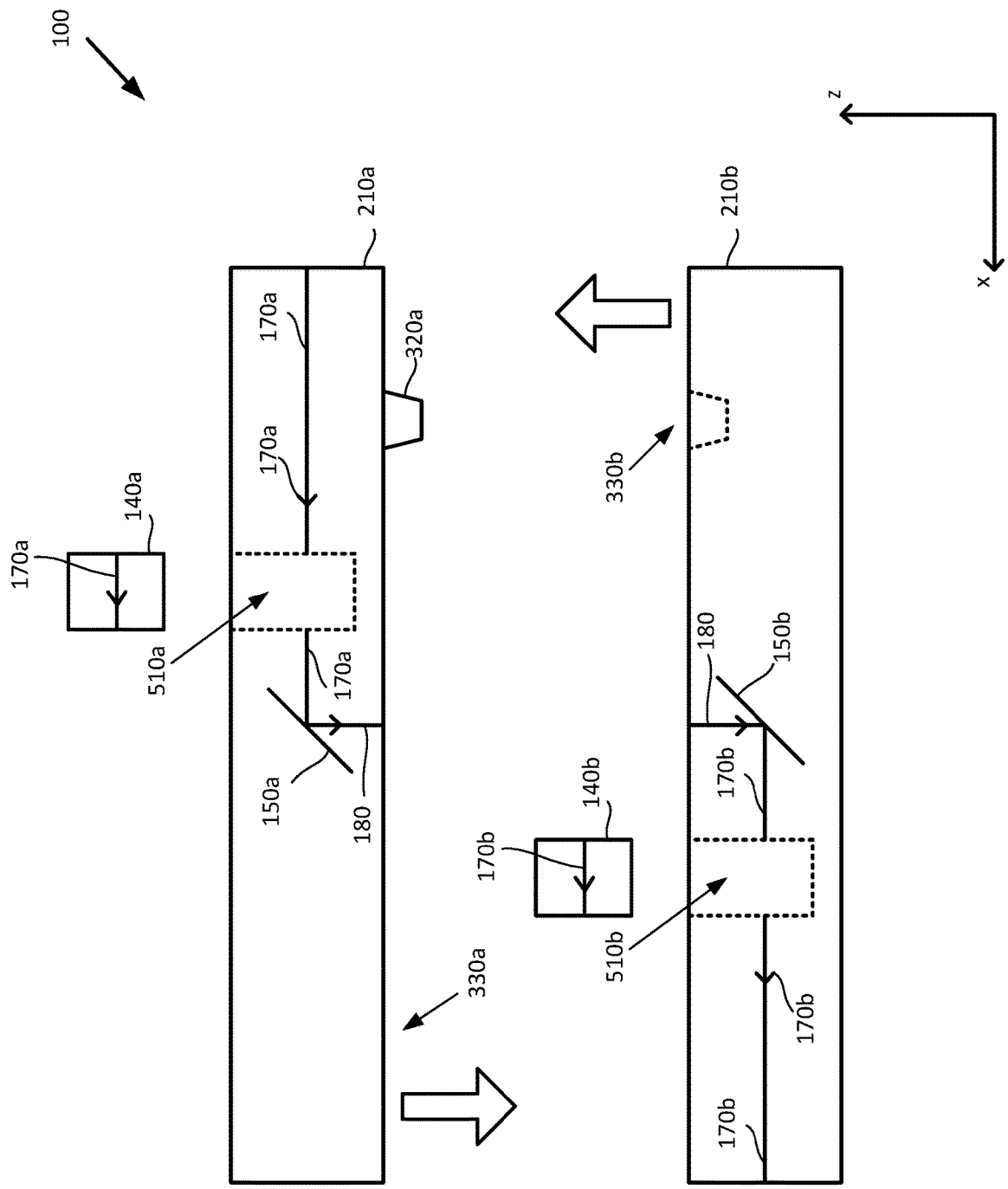
FIGS. 5A-5D illustrate various constructions for a periscope assembly using a third carrier defining some of the first planar path and a fourth carrier define some of the second planar path, according to embodiments of the present disclosure.

In FIG. 5A, a first planar cavity 510a is defined in the first carrier 210a, and a second planar cavity 510b is defined in the second carrier 210b. Each of the planar cavities 510 are defined with an opening on an "upper" surface of the respective carrier 210, and with a "bottom" defined at a depth within the respective carrier 210 providing a reference surface so that an inserted carrier 210 can align an associated waveguide 340 and/or optic 140 with the waveguides 340 of the respective carrier 210. For example, the relative depth of the first planar cavity 510a and the relative height of the sixth waveguide 340f in the third carrier 210c are such that the sixth waveguide 340f is aligned with the first waveguide 340a and the second waveguide 340b to complete the first planar path 170a when the third carrier 210c is inserted into the first planar cavity 510a. In various embodiments, the inserted carrier 210 may completely fill the height of the associated planar cavity 510, a spacer or cap may be inserted in the planar cavity 510 to close the opening, or a portion of the planar cavity 510 may remain unfilled (e.g., the mating surface of the first carrier 210a closing the opening of the second planar cavity 510b, the opening of the first planar cavity 510a remaining open).

Figure 5B:
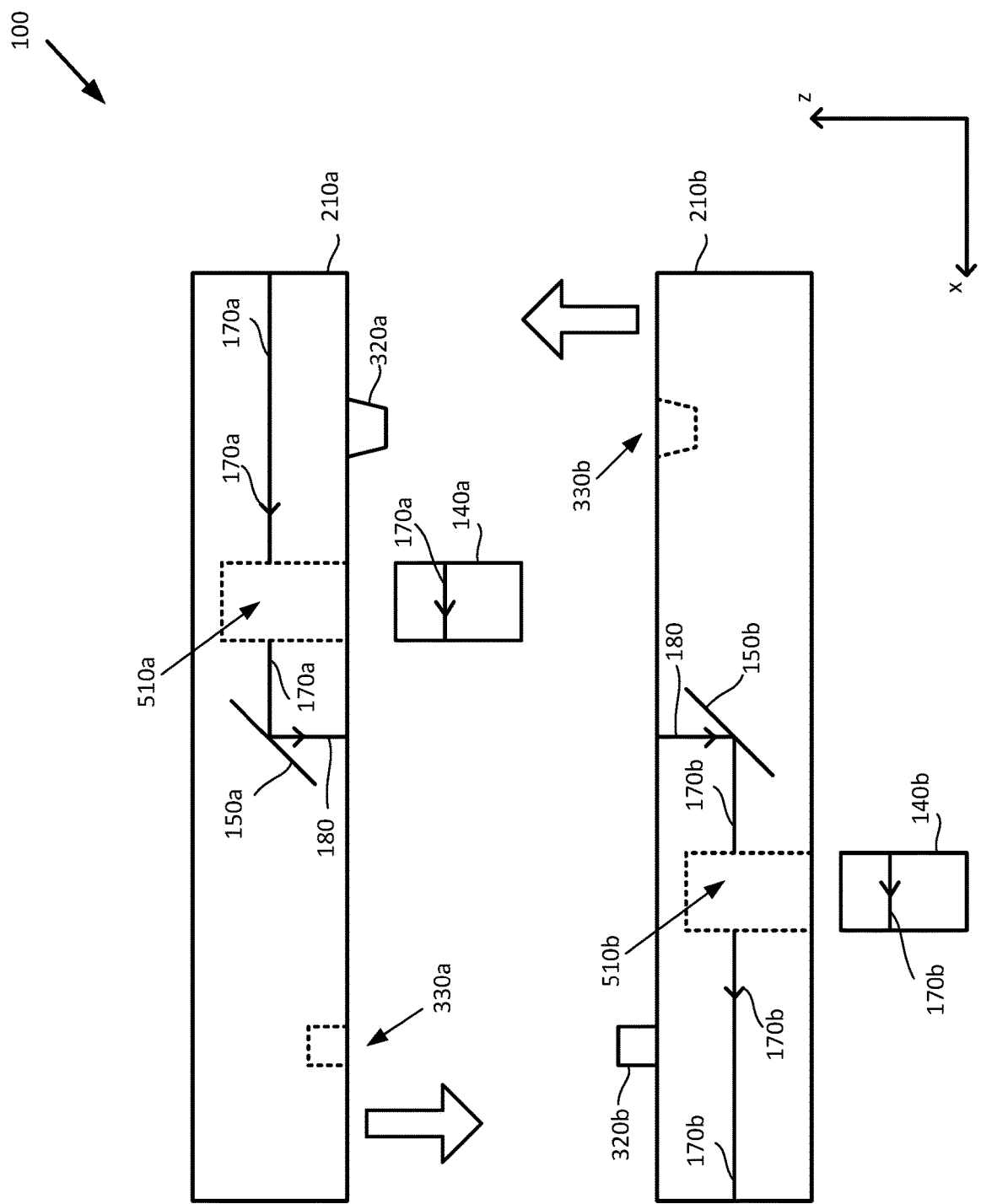

In FIG. 5B, a first planar cavity 510a is defined in the first carrier 210a, and a second planar cavity 510b is defined in the second carrier 210b. Each of the planar cavities 510 are defined with an opening on a "lower" surface of the respective carrier 210, and with a "top" defined at a height within the respective carrier 210 providing a reference surface so that an inserted carrier 210 can align an associated waveguide 340 and/or optic 140 with the waveguides 340 of the respective carrier 210. For example, the relative height of the first planar cavity 510a and the relative height of the sixth waveguide 340f in the third carrier 210c are such that the sixth waveguide 340f is aligned with the first waveguide 340a and the second waveguide 340b to complete the first planar path 170a when the third carrier 210c is inserted into the first planar cavity 510a. In some embodiments, the surface of a component "below" the opening of the respective planar cavity 510 provides a reference surface to align the associated waveguide 340 and/or optic 140 with the waveguides 340 of the respective carrier 210. For example, For example, the relative height of the first planar cavity 510a and the relative height of the sixth waveguide 340f in the third carrier 210c are such that the sixth waveguide 340f is aligned with the first waveguide 340a and the second waveguide 340b to complete the first planar path 170a when the third carrier 210c supported by the mating surface of the second carrier 210b and inserted into the first planar cavity 510a. In various embodiments, the inserted carrier 210 may completely fill the height of the associated planar cavity 510, a spacer or cap may be inserted in the planar cavity 510 to close the opening, or a portion of the planar cavity 510 may remain unfilled (e.g., a gap is left between the upper edge of the inserted carrier 210 and the "top" of the associated planar cavity 510).

Figure 5C:
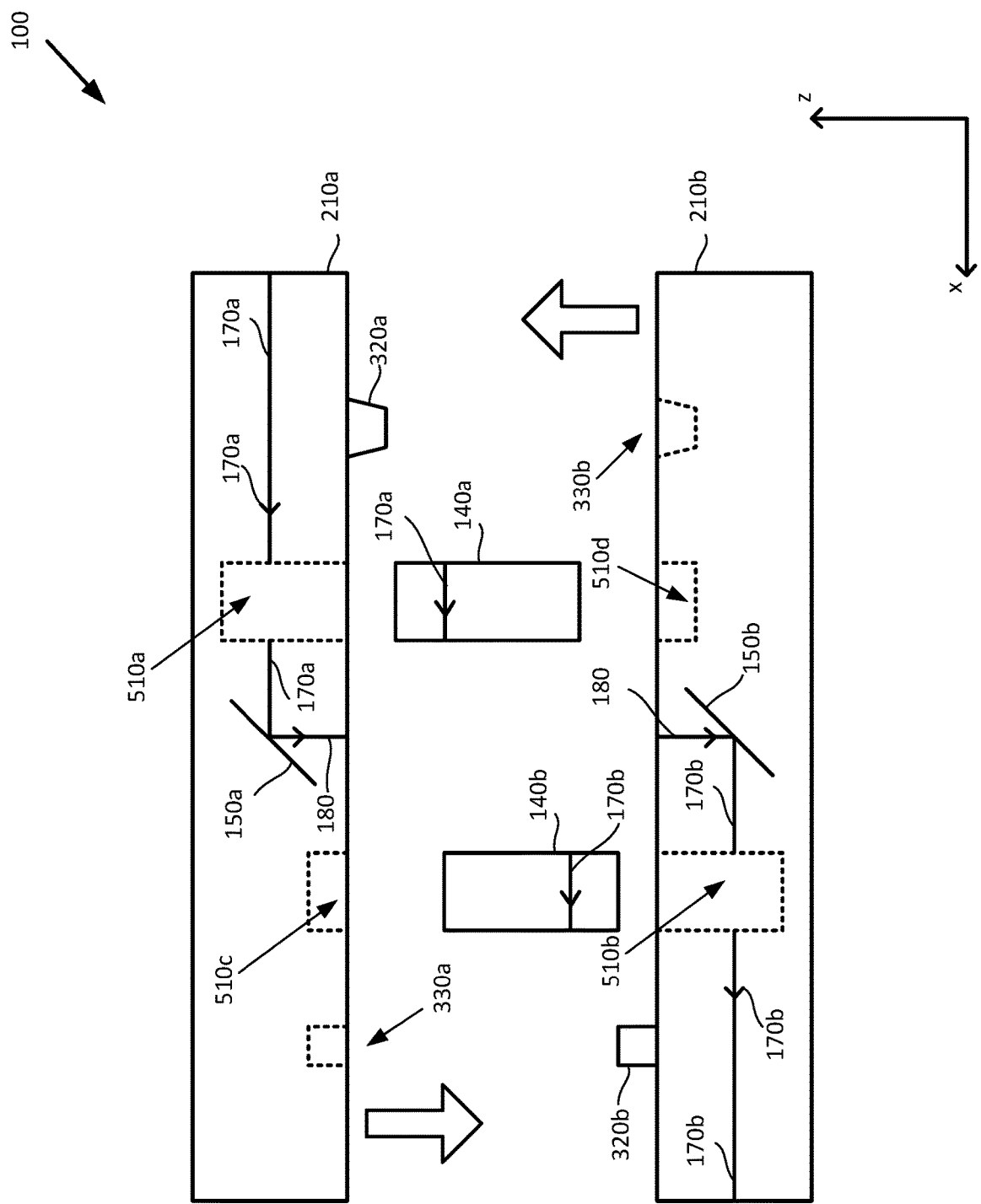

In FIG. 5C, a first planar cavity 510a and a third planar cavity 510c are defined in the first carrier 210a, and a second planar cavity 510b and a fourth planar cavity 510d are defined in the second carrier 210b. The first planar cavity 510a and the fourth planar cavity 510d are paired together to accept insertion of a third carrier 210c, and the second planar cavity 510b and the third planar cavity 510c are paired together to accept insertion of a fourth carrier 210d. The paired cavities 510 allow for the insertion and capture of additional carriers 210 between the first carrier 210a and the second carrier 210b to complete the first and second planar paths 170a-b and to provide additional structural support and/or alignment features in the periscope assembly 100.

Figure 5D:
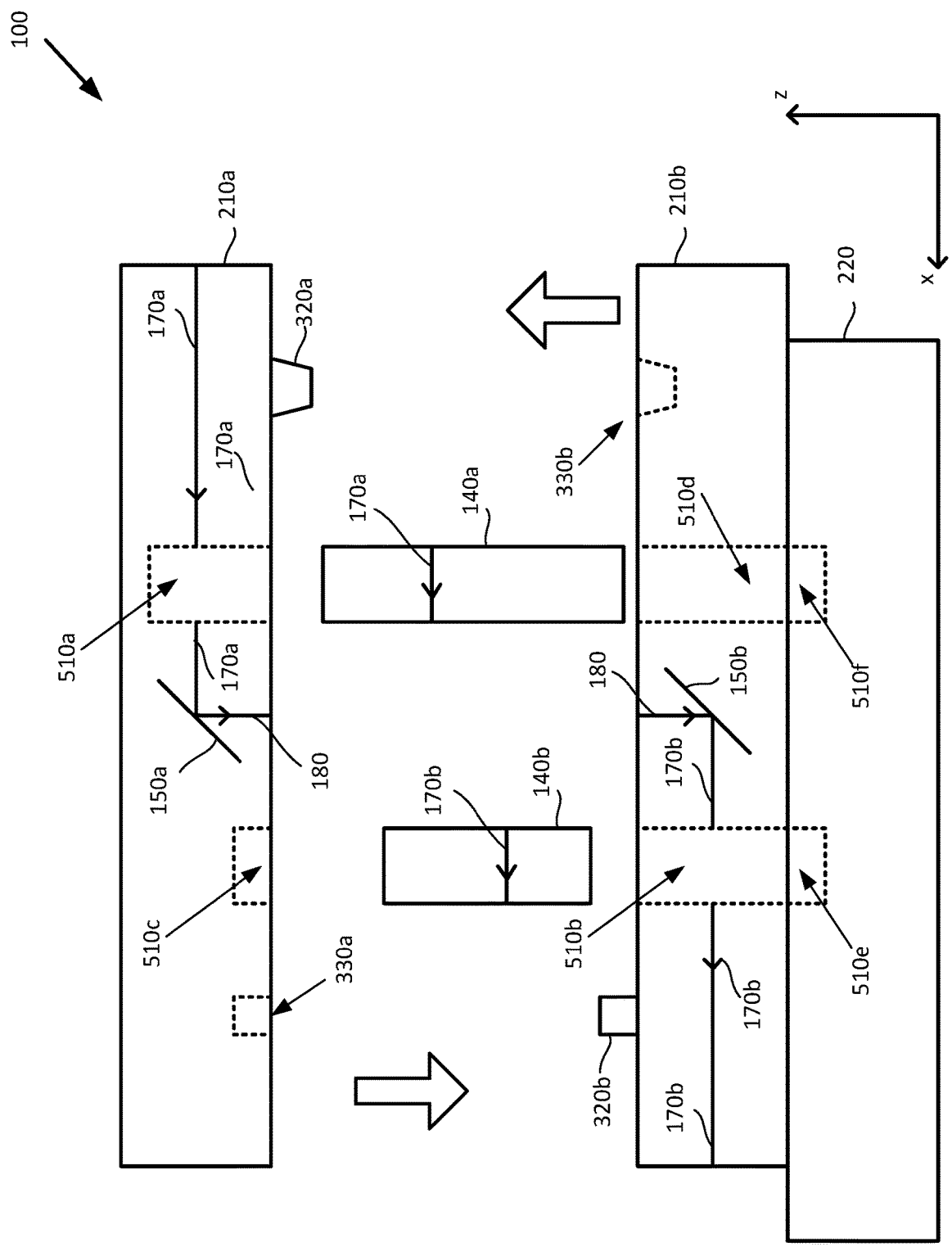

In FIG. 5D, a first planar cavity 510a and a third planar cavity 510c are defined in the first carrier 210a, a second planar cavity 510b and a fourth planar cavity 510d are defined in the second carrier 210b, and a fifth planar cavity 510e and a sixth planar cavity 510f are defined in an optical element 220. The first planar cavity 510a, fourth planar cavity 510d, and sixth planar cavity 510f are grouped together to accept insertion of a third carrier 210c, and the second planar cavity 510b, third planar cavity 510c, and fifth planar cavity 510e are grouped together to accept insertion of a fourth carrier 210d. The grouped cavities 510 allow for the insertion and capture of additional carriers 210 between the first carrier 210a, the second carrier 210b, and optical element 220 to complete the first and second planar paths 170a-b and to provide additional structural support and/or alignment features in the shared photonic platform integrating the periscope assembly 100 and the optical element 220.

Figure 6A:
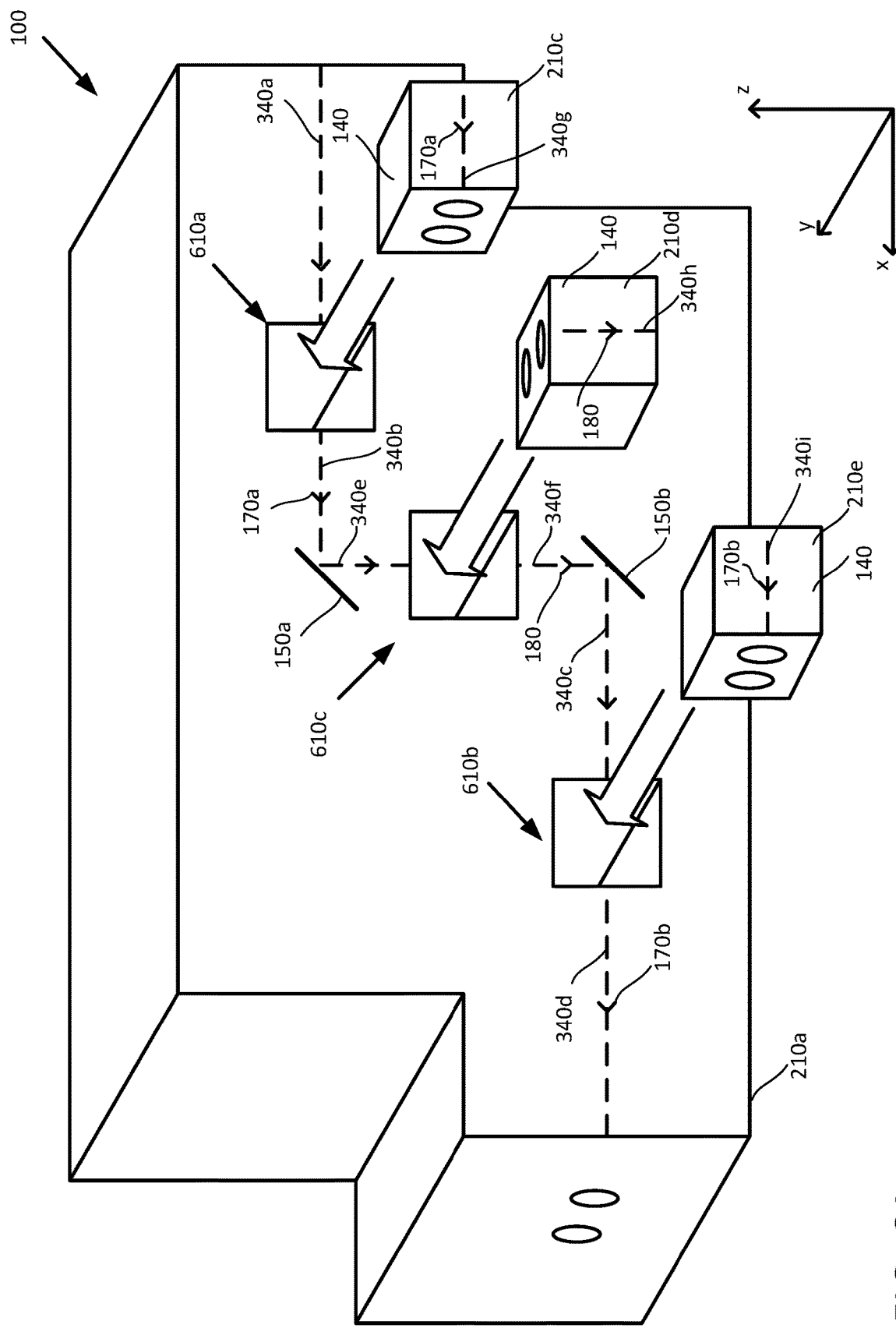
FIGS. 6A-6C illustrate isometric views of the insertion of carriers into a periscope assembly, according to embodiments of the present disclosure.
Figure 6B:
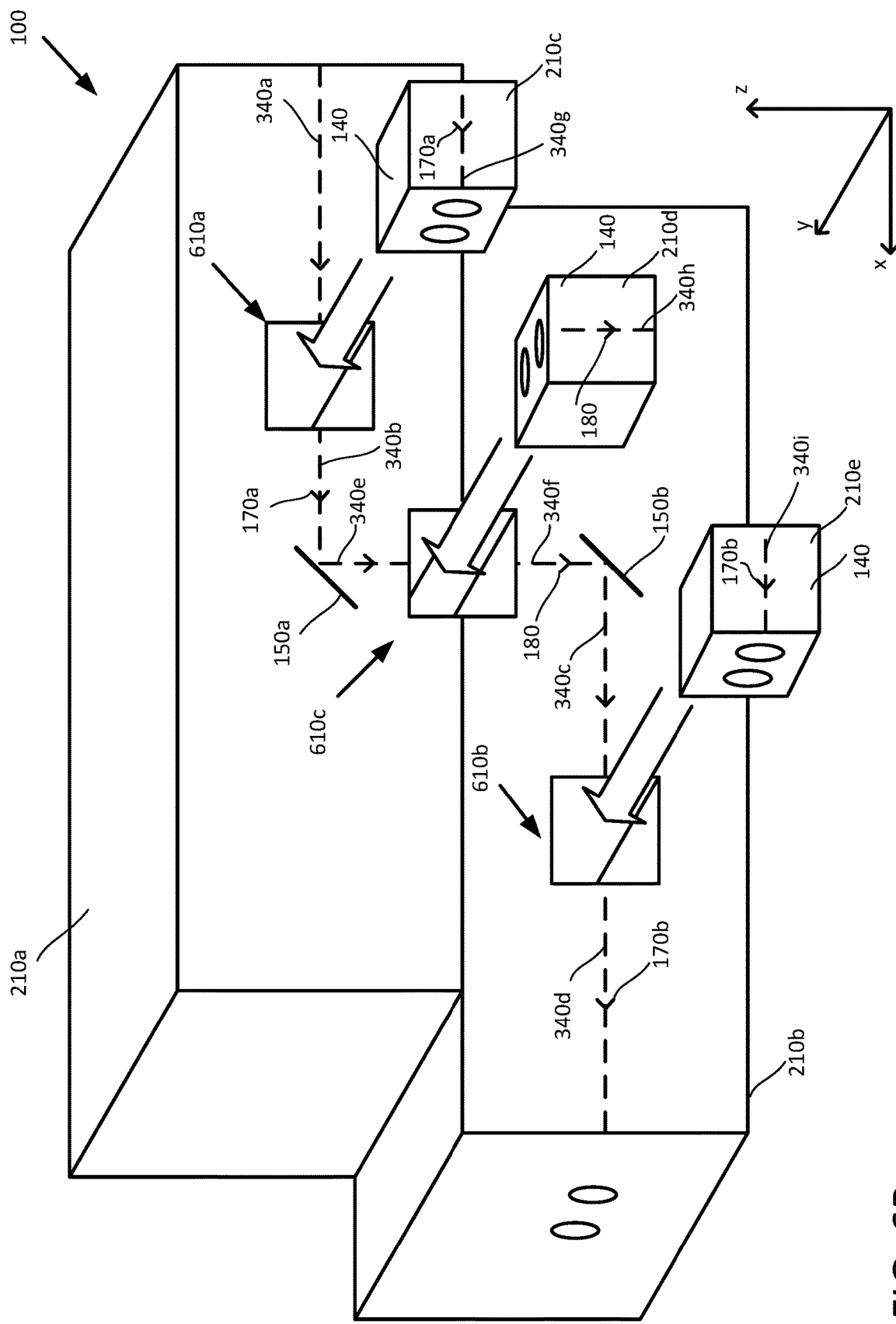
Figure 6C:
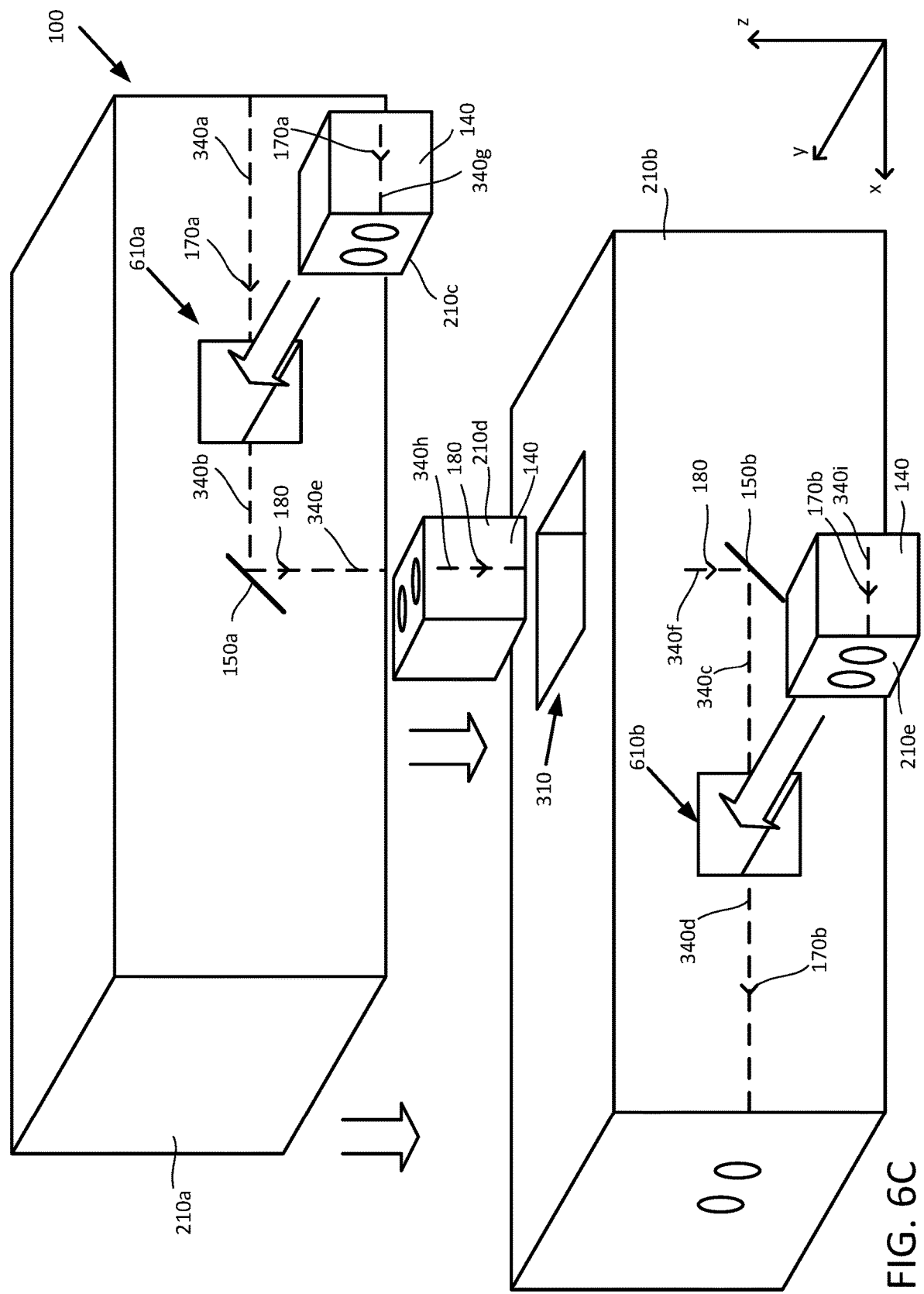

FIGS. 6A-6C illustrate isometric views of the insertion of carriers 210 into a periscope assembly 100, according to embodiments of the present disclosure. Although a carrier 210 or structural insert 230 may be inserted from "underneath" or "above" another carrier 210 into a cavity (e.g., in an opening defined in the xy-plane), carriers 210 can also be inserted from "the side" into another carrier 210 to complete a portion of the light path and/or insert a chosen optic 140 into the light path.

Each of FIGS. 6A-6C illustrate a third carrier 210c that includes a seventh waveguide 340g (and optionally a pre-mirror optic 140a and/or mid-mirror optic 140c), a fourth carrier 210d that includes an eighth waveguide 340h (and optionally a pre-mirror optic 140a, post-mirror optic 140b, and/or mid-mirror optic 140c), and a fifth carrier 210e that includes a ninth waveguide 340i (and optionally a post-mirror optic 140b, and/or mid-mirror optic 140c). Although the mirrors 150 are not illustrated as being included in the third through fifth carriers 210c-e in FIGS. 6A-6C (e.g., in a first or second carrier 210a-b), in other embodiments the mirrors 150 may be defined in any of the inserted carriers 210.

In FIG. 6A, a first carrier 210a includes a first mirror 150a, a first waveguide 340a and a second waveguide 340b that define portions of the first planar path 170a at a first height of the periscope assembly 100 (e.g., between a light input 110 and the first mirror 150a), in which a first lateral cavity 610a (generally, lateral cavity 610) is defined. The first carrier 210a also includes a second mirror 150b, a third waveguide 340c and a fourth waveguide 340d that define portions of the second planar path 170b at a second height of the periscope assembly 100 (e.g., between a light output 160 and the second mirror 150b), in which a second lateral cavity 610b is defined. The first carrier 210a includes a fourth waveguide 340d and a fifth waveguide 340e that define portions of the intersecting path 180, in which a third lateral cavity 610c is defined. The lateral cavities 610 are defined on one or more faces of the first carrier 210a that are different from and lateral to (i.e., not parallel) the faces that the light inputs 110 and light outputs 160 are defined on.

In FIG. 6B, a first carrier 210a includes a first mirror 150a, a first waveguide 340a and a second waveguide 340b that define portions of the first planar path 170a at a first height of the periscope assembly 100 (e.g., between a light input 110 and the first mirror 150a), in which a first lateral cavity 610a (generally, lateral cavity 610) is defined. A second carrier 210b includes a second mirror 150b, a third waveguide 340c and a fourth waveguide 340d that define portions of the second planar path 170b at a second height of the periscope assembly 100 (e.g., between a light output 160 and the second mirror 150b), in which a second lateral cavity 610b is defined. The first carrier 210a includes a fourth waveguide 340d and the second carrier 210b includes a fifth waveguide 340e that define portions of the intersecting path 180, in which a third lateral cavity 610c is defined partially in each of the first and second carriers 210a-b. The lateral cavities 610 are defined on one or more faces of the first carrier 210a and/or second carrier 210b that are different from and lateral to (i.e., not parallel) the faces that the light inputs 110 and light outputs 160 are defined on.

In FIG. 6C, a first carrier 210a includes a first mirror 150a, a first waveguide 340a and a second waveguide 340b that define portions of the first planar path 170a at a first height of the periscope assembly 100 (e.g., between a light input 110 and the first mirror 150a), in which a first lateral cavity 610a (generally, lateral cavity 610) is defined. A second carrier 210b includes a second mirror 150b, a third waveguide 340c and a fourth waveguide 340d that define portions of the second planar path 170b at a second height of the periscope assembly 100 (e.g., between a light output 160 and the second mirror 150b), in which a second lateral cavity 610b is defined. The first carrier 210a includes a fourth waveguide 340d and the second carrier 210b includes a fifth waveguide 340e that define portions of the intersecting path 180, in which an intersecting cavity 310 is defined in the second carrier 210b. The lateral cavities 610 are defined on one or more faces of the first carrier 210a and/or second carrier 210b that are different from and lateral to (i.e., not parallel) the faces that the light inputs 110 and light outputs 160 are defined on. The illustrated intersecting cavity 310 is defined in the mating surface of the second carrier 210b, but may be defined in various surfaces of the carriers 210 and/or optical elements 220, as described in the present disclosure.

Figure 7A:
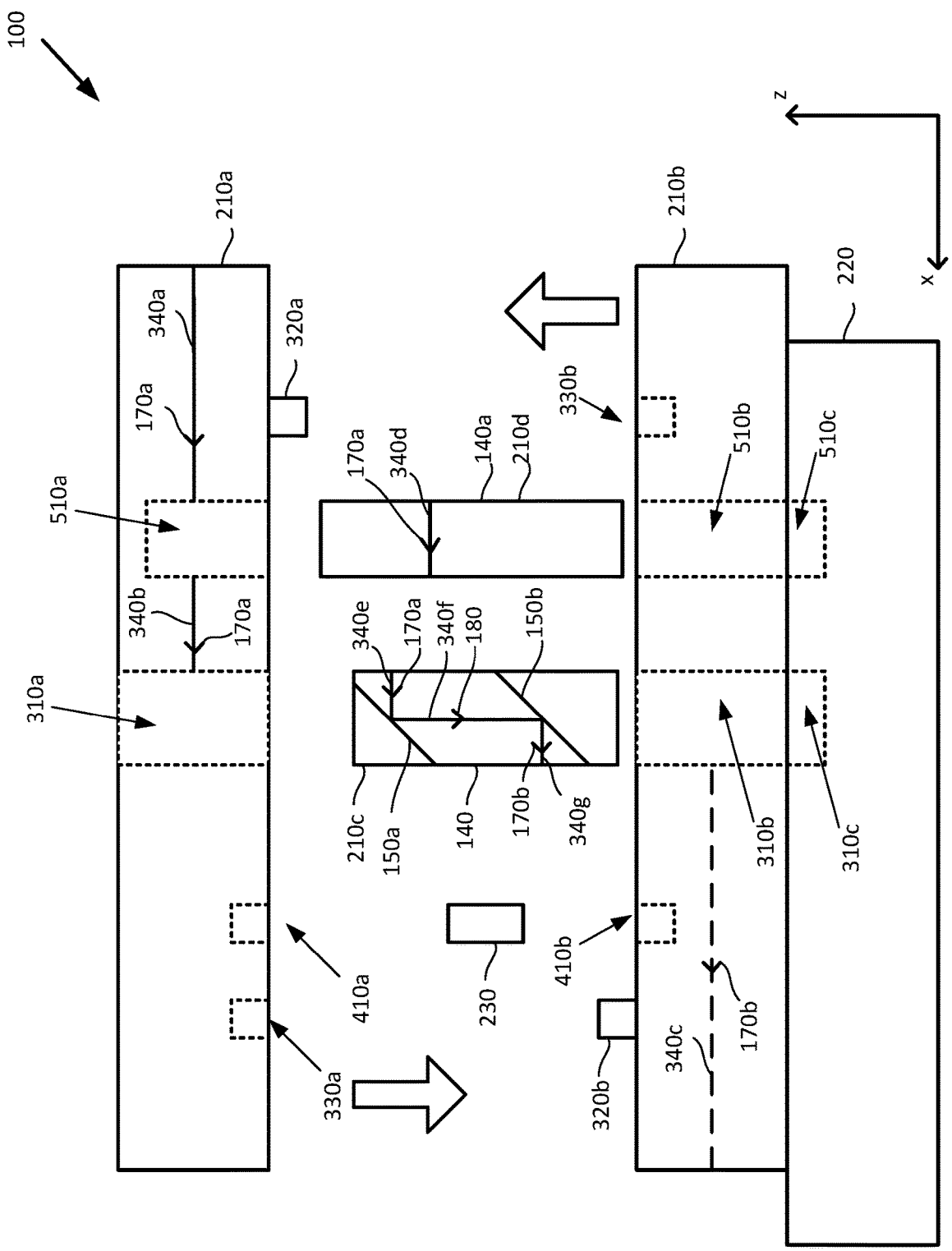
FIGS. 7A and 7B illustrate various constructions for a periscope assembly using several interposed components according to embodiments of the present disclosure.
Figure 7B:
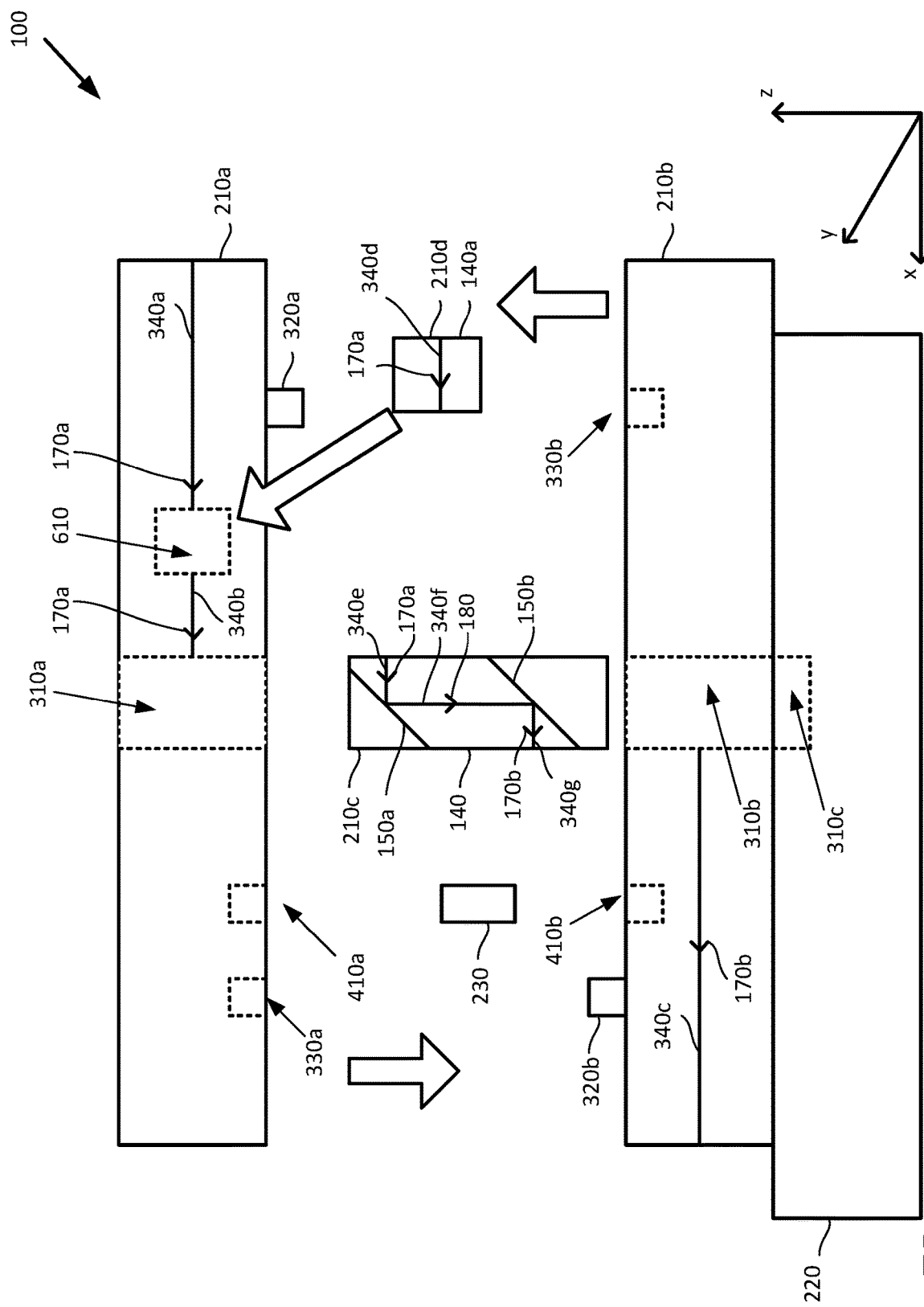

FIGS. 7A and 7B illustrate various constructions for a periscope assembly 100 using several interposed components according to embodiments of the present disclosure. Accordingly, one of skill in the art will be able to freely combine any of the embodiments described in the present disclosure, and permutations thereof, in a single periscope assembly 100.

FIG. 7A illustrates a first carrier 210a that includes a first waveguide 340a and a second waveguide 340b that partially form a first planar path 170a and defines a first intersecting cavity 310a, a first structural cavity 410a, and a first planar cavity 510a. The second carrier 210b includes a third waveguide 340c defining a second planar path 170b, and defines a second intersecting cavity 310b, a second structural cavity 410b, and a second planar cavity 510b. The optical element 220 defines a third intersecting cavity 310c and a third planar cavity 510c.

The periscope assembly 100 of FIG. 7A includes a fourth carrier 210d that includes a fourth waveguide 340d that partially defines the first planar path 170a, and optionally includes a pre-mirror optic 140a. The third carrier 210c is sized and shaped in accordance with the planar cavities 510 for insertion into the first and second carriers 210a-b and the optical element 220, thereby aligning the fourth waveguide 340d (and any associated pre-mirror optics 140a) with the first waveguide 340a and the second waveguide 340b.

FIG. 7B illustrates a first carrier 210a that includes a first waveguide 340a and a second waveguide 340b that partially form a first planar path 170a and defines a first intersecting cavity 310a, a first structural cavity 410a, and a lateral cavity 610. The second carrier 210b includes a third waveguide 340c defining a second planar path 170b, and defines a second intersecting cavity 310b and a second structural cavity 410b. The optical element 220 defines a third intersecting cavity 310c.

The periscope assembly 100 of FIG. 7B includes a fourth carrier 210d that includes a fourth waveguide 340d that partially defines the first planar path 170a, and optionally includes a pre-mirror optic 140a. The fourth carrier 210d is sized and shaped in accordance with the lateral cavity 610 for insertion into the first carrier 210a, thereby aligning the fourth waveguide 340d (and any associated pre-mirror optics 140a) with the first waveguide 340a and the second waveguide 340b.

The periscope assemblies 100 both FIGS. 7A and 7B includes a third carrier 210c that defines a fifth waveguide 340e, a first mirror 150a, a sixth waveguide 340f, a second mirror 150b, and a seventh waveguide 340g. In various embodiments, the third carrier 210c includes one or more optics 140 (e.g., a pre-mirror optic 140a, a post-mirror optic 140b, or a mid-mirror optic 140c). When the third carrier 210c is disposed in the intersect cavities 310, the fifth waveguide 340e is aligned with the second waveguide 340b to complete the first planar path 170a and the seventh waveguide 340g is aligned with the third waveguide 340c to complete the second planar path 170b. Additionally, when the third carrier 210c is disposed in the intersect cavities 310, provides an alignment feature and/or attachment point between the periscope assembly 100 and the optical element 220.

The periscope assemblies 100 of both FIGS. 7A and 7B also include a structural insert 230 that is sized and shaped in accordance with the structural cavities 410. A fabricator may include the structural insert 230 to help align the first carrier 210a with the second carrier 210b, provide additional structural rigidity, provide heat sinking internally to the periscope assembly 100, etc.

In some embodiments, the periscope assembly 100 also includes, defined on the first and second carriers 210a-b, alignment features that include alignment pins 320 and paired alignment cavities 330. For example, a first carrier 210a can define a first alignment pin 320a and a first alignment cavity 330a, and the second carrier 210b can define a second alignment pin 320b and a second alignment cavity 330b, where the first alignment pin 320a aligns with the second alignment cavity 330b and the second alignment pin 320b aligns with the first alignment cavity 330a. The alignment features help ensure that the first carrier 210a and the second carrier 210b are positioned correctly relative to one another to ensure that the light path from the light inputs 110 to the light outputs 160 are properly aligned and that the physical components (e.g., interlocks, waveguide interfaces 120) are also properly aligned.

Figure 8:
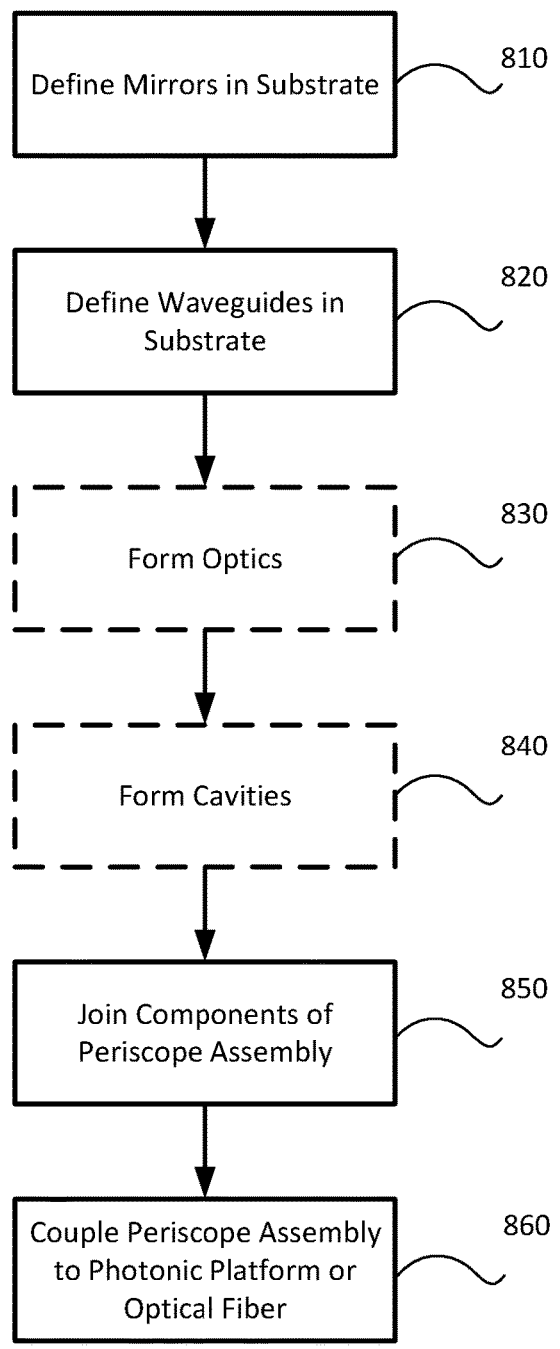
FIG. 8 is a flowchart of a method for construction of a periscope assembly, according to embodiments of the present disclosure.

FIG. 8 is a flowchart of a method 800 for construction of a periscope assembly 100, according to embodiments of the present disclosure.

At block 810, a fabricator defines one or more mirrors 150 in a substrate of a carrier 210 (or a bulk material defining several dies that are to be diced into individual carriers 210). At block 820, the fabricator defines one or more waveguides 340 in the substrates for the carriers 210. Although illustrated as beginning with block 810 and proceeding to block 820, in various embodiments, method 800 may begin with either of block 810 or block 820 and proceed to the other, or may begin simultaneously at block 810 and block 820. Additionally or alternatively, a fabricator may perform block 810 and block 820 in alternating iterations (e.g., forming a first mirror 150a, then forming one or more waveguides 340, then forming a second mirror 150b) or in phases (e.g., performing a first phase of block 810, performing block 820, performing a second phase of block 810). Additionally, the fabricator may perform blocks 810 and block 820 separately for each carrier 210.

When forming mirrors 150 (per block 810), a fabricator may use one or more of a laser patterning process, an etching process, or a metal deposition process to define mirrors 150 in the substrate or physical attachment process to bind the mirror 150 to the substrate. A laser patterning process defines mirrors 150 via a change in the material matrix of the substrate that affects the reflectivity of the substrate in a designated region, thereby defining a reflective surface with a desired shape and orientation in the substrate. An etching process removes material from the substrate to define a void with one or more surfaces that may be polished or have a surface treatment applied thereto, thereby defining a reflective surface with a desired shape and orientation in the substrate. A metal deposition process adds a reflective coating to a surface or defines a reflective region within a grown substrate. In various embodiments, the etching process is preceded by a laser patterning process that changes the reactivity of a designated region of the substrate to a chemical etchant (e.g., via changing the chemical bond in regions of the material matrix of the substrate). The reflective surface receives optical signals carried on one waveguide 340 and redirects those optical signals by a predefined reflective angle onto another waveguide 340.

When forming waveguides 340 (per block 820), a fabricator may use a laser patterning process to define regions in the substrate with different refractive indices than the surrounding material to direct the propagation of light through the material. The waveguides 340 may have ends that are co-aligned with engagement features defined in the substrate to ensure optical coupling with waveguides in other assemblies or components. Similarly, the waveguides 340 may have ends that that are co-aligned with one or more mirrors 150.

In some embodiments, the laser defines where the waveguide pattern is located simultaneously with where the etching pattern is applied relative to the alignment point. In other embodiments, the etching pattern is applied relative to the alignment point, and the waveguide pattern is later applied relative to the etching pattern (e.g., after a chemical etch). In further embodiments, the waveguide pattern is applied relative to the alignment point, and the etching pattern is later applied relative to the waveguide pattern.

Optionally, at block 830, the fabricator forms one or more optics 140 in one or more carriers 210. Depending on the construction and layout of the periscope assembly 100, some carriers 210 may omit additional optics 140 (e.g., include only waveguides 340 and/or mirrors 150), while other carriers 210 may include one or multiple optics 140 (e.g., lenses, optical filters (e.g., highpass, lowpass, bandpass, and polarity filters), polarization rotators, optical amplifiers, lasers, heatsinks, heaters, thermal insulators, phase shifters, optical signal probes, optical isolators, alternative transmission materials, etc.). Block 830, if performed for a given carrier 210, may be performed simultaneously, before, or after performing blocks 810, 820, and/or 840 for the given carrier 210.

Optionally, at block 840, the fabricator forms one or more cavities in one or more carriers 210. Depending on the construction and layout of the periscope assembly 100, some carriers 210 may omit cavities (e.g., carriers 210 intended for insertion into cavities), while other carriers 210 may include one or multiple cavities (e.g., intersect cavities 310, structural cavities 410, planar cavities 510, and/or lateral cavities 610). In various embodiments, the cavities may be defined via chemical etching (which may be laser-assisted via an etching pattern), physical etching, or a combination of chemical and physical etching. Block 840, if performed for a given carrier 210, may be performed simultaneously, before, or after performing blocks 810, 820, and/or 830 for the given carrier 210.

At block 850, the fabricator joins the components of the periscope assembly 100 (including carriers 210 and/or structural inserts 230) together. In various embodiments, the fabricator may detail the components before joining, which may include dicing the substrate(s) into a desired shape, polishing at least one external surface, applying epoxies or heat treatments for affixing the components together, and the like. Various alignment features may be included in the components to ensure that the portions of waveguides 340 defined in different components are optically aligned with one another.

At block 860, the fabricator couples the periscope assembly 100 to one or more of an optical fiber or a shared photonic platform. In various embodiments, based on the alignment and pathing of the waveguides 340, the fabricator may couple the periscope assembly 100 via an evanescent transfer or direct transfer (e.g., a butt coupling) of optical signals to/from the photonic platform or optical fiber. The fabricator may couple the periscope assembly 100 and the other optical elements 220 together via epoxies, physical interconnects, thermo-compression, or the like. Method 800 may then conclude.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. A periscope assembly, comprising:
   a first carrier comprising a first waveguide and defining a first cavity and a second cavity;
   a second carrier comprising a second waveguide and defining a third cavity and a fourth cavity;
   a third carrier comprising a third waveguide, wherein the third carrier is disposed in the first cavity and in the third cavity;
   a first mirror optically coupled to the first waveguide and the third waveguide;
   a second mirror optically coupled to the third waveguide and the second waveguide; and
   a structural insert disposed in the second cavity and the fourth cavity, wherein a light path extends in a first plane along the first waveguide, a second plane along the second waveguide that is parallel to the first plane, and along a third plane along the third waveguide that intersects the first plane and the second plane, and wherein the second cavity and the fourth cavity are outside of the light path.

2. The periscope assembly of claim 1, wherein the third plane is perpendicular to the first plane and the second plane.

3. The periscope assembly of claim 1, wherein the first carrier and the second carrier are mounted to a shared platform via the structural insert, wherein the shared platform defines a fifth cavity, and wherein the structural insert is disposed in the fifth cavity.

4. The periscope assembly of claim 1, wherein the first carrier and the second carrier are mounted to a shared platform via the third carrier, wherein the shared platform defines a third cavity, and wherein the third carrier is disposed in the third cavity.

5. The periscope assembly of claim 1, wherein the first cavity defines a first opening in a first plane, wherein the third cavity defines a second opening in a second plane parallel to the first plane, wherein the first cavity extends partially through the first carrier in a first direction from the first opening, and wherein the third cavity extends partially through the second carrier in a second direction from the second opening that is opposite to the first direction.

6. The periscope assembly of claim 1, wherein the first mirror is defined in the third carrier, wherein the first mirror is optically coupled to the first waveguide via a fourth waveguide defined in the third carrier.

7. The periscope assembly of claim 6, wherein the second mirror is defined in the third carrier, wherein the second mirror is optically coupled to the second waveguide via a fifth waveguide defined in the third carrier.

8. The periscope assembly of claim 1, further comprising:
   a fourth carrier, comprising a fourth waveguide; and
   wherein the first carrier defines a third cavity in the light path of the first waveguide, wherein the fourth carrier is disposed in the third cavity and completes the first waveguide via the fourth waveguide.

9. The periscope assembly of claim 8, wherein the second carrier defines a fourth cavity, and wherein the fourth carrier is also disposed in the fourth cavity.

10. The periscope assembly of claim 8, wherein the first cavity defines a first opening in a first plane, the second cavity defines a second opening in a second plane parallel to the first plane, and the third cavity defines a third opening in a third plane perpendicular to the first plane.

11. The periscope assembly of claim 8, wherein the first cavity defines a first opening in a first plane, the second cavity defines a second opening in a second plane parallel to the first plane, and the third cavity defines a third opening in a third plane parallel to the first plane.

12. The periscope assembly of claim 8, wherein the fourth waveguide includes an optic configured to alter an optical property of an optical signal transmitted over the fourth waveguide.

13. The periscope assembly of claim 1, wherein one of the first waveguide, the second waveguide, or the third waveguide includes an optic selected from a group of optical devices consisting of:
   a lens;
   a highpass filter;
   a lowpass filter;
   a bandpass filter;
   a polarity filter;
   a polarization rotator;
   an optical amplifier;
   a laser;
   an optical isolator;
   a heatsink;
   a thermal insulator;
   a thermal heating element;
   a phase shifter; and
   an optical signal probe.

* * * * *